(12) United States Patent
Bennett-James et al.

(10) Patent No.: US 12,464,034 B2
(45) Date of Patent: *Nov. 4, 2025

(54) CONTENT COMPLETION DETECTION FOR MEDIA CONTENT

(71) Applicant: NAGRAVISION SARL, Cheseaux-sur-Lausanne (CH)

(72) Inventors: Jonathan Bennett-James, Wales (GB); Bineet Kumar Singh, Karnataka (IN); Nishant Kumar, Karnataka (IN)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,488

(22) Filed: Jan. 26, 2024

(65) Prior Publication Data
US 2024/0244098 A1    Jul. 18, 2024

Related U.S. Application Data

(63) Continuation of application No. 17/543,377, filed on Dec. 6, 2021, now Pat. No. 11,930,063.

(60) Provisional application No. 63/123,259, filed on Dec. 9, 2020.

(51) Int. Cl.
*H04L 65/613*    (2022.01)

(52) U.S. Cl.
CPC ................. *H04L 65/613* (2022.05)

(58) Field of Classification Search
CPC ............ H04N 21/812; H04N 21/8456; H04N 21/44008
See application file for complete search history.

(56) References Cited

U.S. PATENT DOCUMENTS

| | | | | |
|---|---|---|---|---|
| 6,100,941 | A  * | 8/2000 | Dimitrova | G06F 16/7328 348/700 |
| 2003/0117530 | A1* | 6/2003 | McGee | H04N 5/44 348/700 |
| 2008/0127244 | A1* | 5/2008 | Zhang | H04N 5/147 725/32 |
| 2016/0182951 | A1* | 6/2016 | Thomas | H04N 21/466 725/32 |
| 2018/0302666 | A1* | 10/2018 | Wright | H04N 21/4402 |
| 2019/0147105 | A1* | 5/2019 | Chu | G06F 18/24143 386/241 |
| 2021/0014565 | A1* | 1/2021 | Zamudio | H04N 21/4516 |

FOREIGN PATENT DOCUMENTS

EP    1006685 A2 *    6/2000    ............. G11B 27/22

* cited by examiner

*Primary Examiner* — Caroline H Jahnige
(74) *Attorney, Agent, or Firm* — POLSINELLI LLP

(57) ABSTRACT

Systems and techniques are described herein for processing media content. For example, a process can include obtaining a first media frame and a second media frame. The process can include generating, using a first change detector, a first tag indicating a change above a first change threshold has occurred in the second media frame relative to the first media frame. The process can further include generating, using a machine learning model, a second tag indicating that media content of the second media frame is associated with a particular type of media content. The process can further include determining, based the first tag and the second tag, that the media content of the second media frame is associated with the particular type of media content.

20 Claims, 10 Drawing Sheets

CONTENT COMPLETION DETECTION FOR MEDIA CONTENT

CROSS-REFERENCE TO RELATED APPLICATIONS

This application is a continuation of U.S. patent application Ser. No. 17/543,377 filed Dec. 6, 2021, which claims the benefit of U.S. Provisional Application No. 63/123,259, filed Dec. 9, 2020, both of which are hereby incorporated by reference, in their entirety and for all purposes.

FIELD

The present disclosure generally relates to processing of media content. In some examples, aspects described herein are related to performing content completion detection for media content.

BACKGROUND

Media capture devices can capture various types of media content, including images, video, and/or audio. For example, a camera can capture image data or video data of a scene. The media data from a media capture device can be captured and output for processing and/or consumption. For instance, a video of a scene can be captured and processed for display on one or more viewing devices. In some cases, media content (e.g., live media content) can be provided to a device of a user for display. Based on media content of a particular type being displayed on a current channel of the media content, the user may cause the device to change from the current channel to a different channel of the media content. However, there is no mechanism or process for detecting completion of the particular type of media content.

SUMMARY

Techniques and systems are described herein for processing media content. In some examples, systems and techniques are described for determining completion of one or more types of media content and performing one or more functions based determining that the one or more types of media content are complete.

According to at least one example, a method for processing media content is provided. The process includes: obtaining a first media frame and a second media frame; generating, using a first change detector, a first tag indicating a change above a first change threshold has occurred in the second media frame relative to the first media frame; generating, using a machine learning model, a second tag indicating that media content of the second media frame is associated with a particular type of media content; and determining, based the first tag and the second tag, that the media content of the second media frame is associated with the particular type of media content.

In another example, a system or computing device is provided that includes a storage (e.g., one or more memory devices or components) configured to store instructions and a processor (e.g., one or multiple processors) configured to execute the instructions and cause the processor (or multiple processors) to: obtain a first media frame and a second media frame; generating, use a first change detector, a first tag indicating a change above a first change threshold has occurred in the second media frame relative to the first media frame; generate, use a machine learning model, a second tag indicating that media content of the second media frame is associated with a particular type of media content; and determine, based the first tag and the second tag, that the media content of the second media frame is associated with the particular type of media content.

In another example, a computer-readable storage medium is provided that stores instructions that, when executed, cause one or more processors to: obtain a first media frame and a second media frame; generating, use a first change detector, a first tag indicating a change above a first change threshold has occurred in the second media frame relative to the first media frame; generate, use a machine learning model, a second tag indicating that media content of the second media frame is associated with a particular type of media content; and determine, based the first tag and the second tag, that the media content of the second media frame is associated with the particular type of media content.

In some aspects, the apparatuses described above can be part of a computing device, such as a server computer, a mobile device, a set-top box, a personal computer, a laptop computer, a tablet computer, a television, a virtual reality (VR) device, an augmented reality (AR) device, a mixed reality (MR) device, a wearable device, and/or other device. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
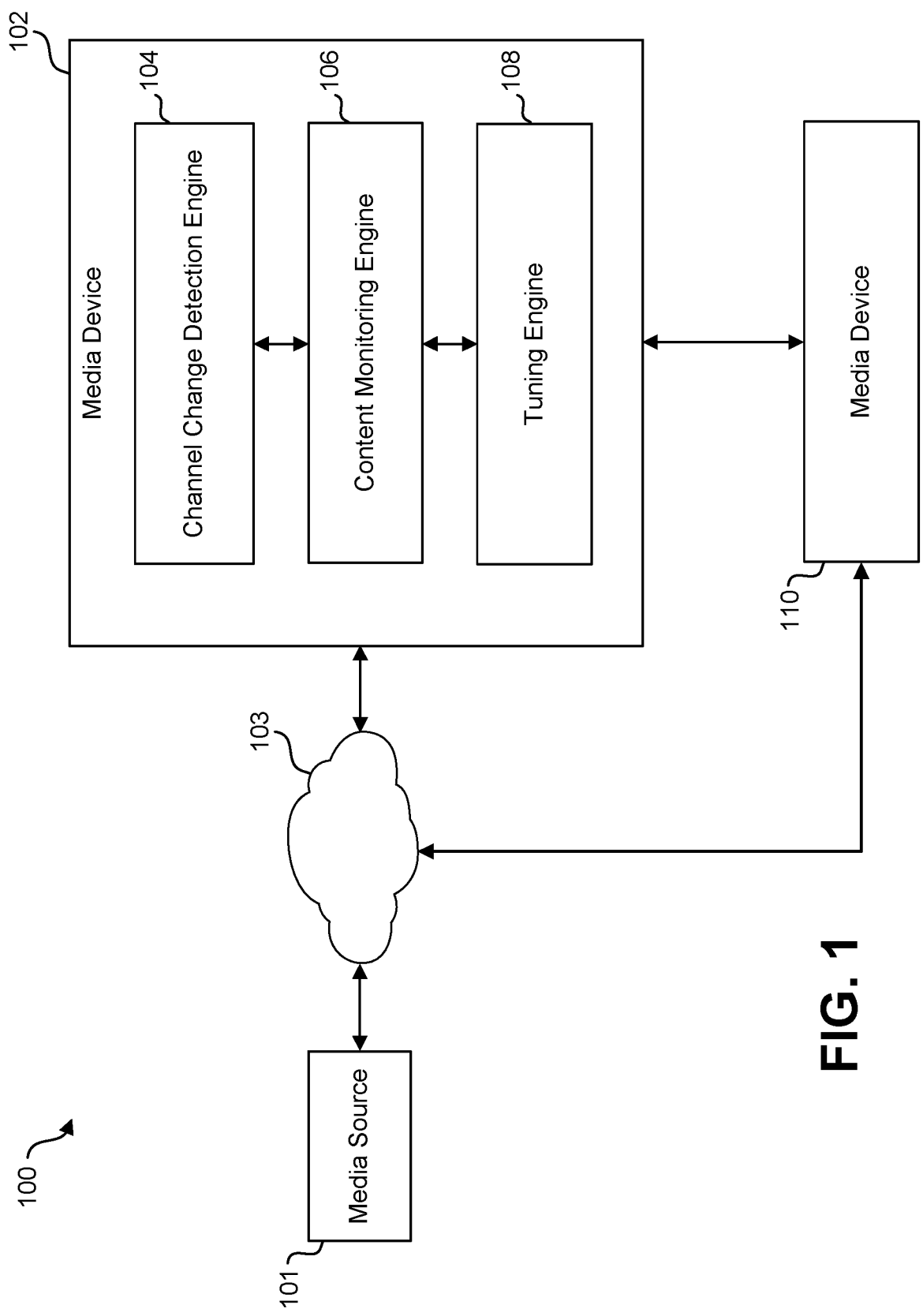
FIG. 1 is a block diagram illustrating an example of a system for determining completion of media content, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Various types of media content can be provided for consumption, including video, audio, images, and/or other types of media content. For example, media content can be provided to a user device for display. The media content can include live content and/or pre-recorded content. The media content can include a television broadcast (e.g., broadcast over a cable network, Satellite network, etc.), a video stream (e.g., streamed over the Internet or other communications network), an audio broadcast, an audio stream, and/or other media content. In some cases, particular types of content can be played along with the live media content, such as third-party content (e.g., commercials or advertisements or other third-party content), informational content (e.g., a public service announcement or other informational content), and/or other types of content.

In some cases, when media content of a particular type is displayed by a device as a user of the device is viewing a first channel, the user may decide to instruct (e.g., using a remote control, a mobile device, or other mechanism) the device to change from the first channel to a second channel. It would be beneficial to detect the end of the particular type of media content, and either change the channel back from the second channel to the first channel or output a notification to indicate to the user that the particular type of media content has ended (in which case the user may want to cause the device to switch back to the first channel). In one illustrative example, third party content (e.g., an advertisement) may begin playing while a device is displaying (and a user is watching) a first television channel. The user may decide to switch the device to a second channel instead of continuing to view the third-party content. If the user wants to know if the third-party content has completed or not, the user will have to change back to the first channel and will have to continue checking until the third-party content has completed. It would be beneficial for the user device or other device to indicate to the user that the third-party content has completed, so that the user can decide whether to switch back to the first television channel. It would also be beneficial to automatically change or tune back to the first channel upon completion of the third-party content.

Systems, apparatuses, methods (or processes), and computer-readable media (collectively referred to herein as "systems and techniques") are described herein for performing content monitoring to detect completion of certain types of media content. In some examples, the systems and techniques can determine completion of one or more types of media content and can perform one or more functions based determining that the one or more types of media content are complete. In one illustrative example, the one or more functions can include automatically changing or tuning content to a channel upon determining completion of a type of media content (e.g., third party content, informational content, etc.) on the channel. In another illustrative example, the one or more functions can include generating and/or outputting a notification indicating that a type of media content (e.g., third party content, informational content, etc.) has completed on a given channel.

The media content can include video content (e.g., a movie, a show, a home video, etc., which may also include audio content), audio content (e.g., a song, an album, etc.), a combination of audio and video, and/or other media content. In some examples, the media content can include live media content and/or pre-recorded media content. For example, live media content can include media content that is broadcast, streamed, or otherwise output as the event being captured by the media content is occurring. Pre-recorded media content can include media content that is output for consumption after an event captured by the media content has previously occurred. As used herein, the term "channel" can refer to a television channel, a channel of a streaming (or "over-the-top" (OTT)) content provider (e.g., a YouTube™ channel, a Pandora™ music channel, a streaming service offered by a cable or television provider, or the like), or other channel providing media content for playback or presentation by a user device.

In some examples, a change determination engine can be used to determine when a change in media content has occurred on a channel. For example, the change determination engine can compare characteristics of two media frames (e.g., video frames) to determine whether a change has occurred between the media frames. In some implementations, the change determination engine can include a spatial segmentation engine, a media frame comparison engine, an audio segmentation engine, any combination thereof, and/or other engines for determining change between frames of media content. Details regarding the change determination engine are described herein.

In some examples, a machine learning system can be used to determine or estimate whether a frame of media content on a given channel is of a particular type of media content (e.g., whether the media content is third party content, informational content, etc.). In one illustrative example, the machine learning system can include a neural network, such as a convolutional neural network (CNN), a Siamese CNN, and/or other type of neural network. The machine learning system can be used in addition to or as an alternative to the change determination engine.

In some examples, a content type determination engine can receive one or more tags output by the change determination engine and/or the machine learning system. Using the one or more tags, the content type determination engine can determine whether displayed content includes content of the particular type (e.g., whether content of the particular type has started or ended). In response to determining completion of the type of media content on a given channel, the content type determination engine can cause a user device to automatically change or tune content to the channel and/or can output a notification (e.g., by displaying a visual notification and/or outputting an audible notification)

indicating that the media content having the particular type has completed on the channel.

The systems and techniques described herein can be used to efficiently determine when a particular type of media content has completed, allowing savings in computing resources and/or time (e.g., as compared to systems that do not perform content completion detection). For example, the content completion systems and techniques can allow more efficient switching between media channels. In another example, the content completion systems and techniques can be used to insert a particular type of content (e.g., third party content, informational content, etc.) at the completion of media content. Accurately detecting the end of the media content can allow the type of content (e.g., an advertisement) to be played out without the need for a pre-determined indicator or time window.

Further details regarding the systems and techniques are provided herein with respect to various figures. FIG. 1 is a block diagram illustrating an example of a system 100 including a media device 102 that can be used to determine completion of media content. The system 100 includes various components, including a media source 101, the media device 102, and a media device 110. The media device 102 is in communication with the media source 101 over a network 103 and is in communication with the media device 110 (e.g., using a direct communication protocol such as Bluetooth™ or over the network 103). The network 103 can include a wide area network (e.g., a cellular network such as an LTE/4G network, a NR/5G network, or the like), a local area network (LAN) (e.g., a WiFi network), and/or other type of network.

The media source 101 can provide any type of media content, including video, audio, images, any combination thereof, and/or any other type of media on a variety of channels. For instance, the media source 101 can provide video content, such as a movie, a show, and/or other type of video content on a given channel. The media source 101 can include one or more media capture devices, one or more storage devices for storing media content, a system of a media service provider (e.g., a broadcast content provider, a streaming or OTT content provider, etc.), any combination thereof, and/or any other source of media content. A media capture device can include a personal or commercial video camera (e.g., a digital camera, an Internet Protocol (IP) camera, a video streaming device, or other suitable type of video camera), a mobile or stationary telephone handset (e.g., smartphone, cellular telephone, or the like), an audio capture device (e.g., a voice recorder, a microphone, or other suitable audio capture device), a camera for capturing still images, or any other type of media capture device. In some cases, the system of the media service provider can include one or more server computers.

The media device 102 and/or the media device 110 can receive the media content from the media source 101. In some cases, the media device 110 can receive the media content from the media device 110. The media device 102 and/or the media device 110 can process the media content to perform content monitoring for detecting completion of various types of media content. The media device 102 and the media device 110 can include any type of computing device, such as a mobile device (e.g., a mobile phone, such as a "smart" phone), a television (e.g., a network-connected or "smart" television), a set-top box, a laptop computing device, a desktop computing device, a tablet computing device, a wearable device (e.g., a virtual reality (VR) headset, an augmented reality (AR) headset, AR glasses, a network-connected watch or smartwatch, or other wearable device), a server computer, a robotic device, and/or any other computing device with the resource capabilities to perform the processes described herein. In one illustrative example, the media device 102 includes a set-top box and the media device 110 includes a television (e.g., a network-connected or "smart" television). In such an example, the set-top box can perform content completion detection and, upon determining completion of content, can send a notification to the television and/or can control the television to switch between channels. In another illustrative example, the media device 102 includes a set-top box or a television and the media device 110 includes a mobile device (e.g., a mobile phone). In such an example, the set-top box or television can perform content completion detection and, once completion of content is detected, can send a notification to the mobile device and/or can control the television to switch between channels. In another illustrative example, the media device 102 includes a computing device (e.g., a television, a mobile device, or other device). In such an example, the media device 102 can perform content completion detection and, upon detecting completion of content, can output a notification (e.g., using a display and/or speakers of the media device 102) and/or can switch between channels (e.g., without any input from the media device 110 or other device).

A user can provide user input to the media device 102 using an input interface of the media device 102 and/or an input interface of the media device 110 (e.g., a touchscreen interface, a keypad interface, using voice or audio input, gesture input detected using one or more sensors or cameras of the media device 102 and/or the media device 110, and/or other input interface), using an external device (e.g., a remote control, using the media device 110 or other device to control the media device 102, a mouse, a keyboard, and/or other external device), and/or using another input device. For example, as described in more detail below, a user can provide the user input to indicate whether the user wants to activate or set a content monitoring setting, an auto-tune setting, and/or other settings of the media device 102 and/or the media device 110.

While the media device 102 is shown to include certain components, one of ordinary skill will appreciate that the media device 102 can include more or fewer components than those shown in FIG. 1. For example, the media device 102 may also include, in some instances, one or more memory (e.g., one or more RAM, ROM, cache, buffers, and/or the like) and/or processing devices that are not shown in FIG. 1. The components of the media device 102 can include electronic circuits or other electronic hardware, which can include one or more programmable electronic circuits (e.g., microprocessors, graphics processing units (GPUs), digital signal processors (DSPs), central processing units (CPUs), neural processing engines (NPEs) or neural processing units (NPUs), or other suitable electronic circuits), computer software, firmware, or any combination thereof, to perform the various operations described herein.

Figure 2:
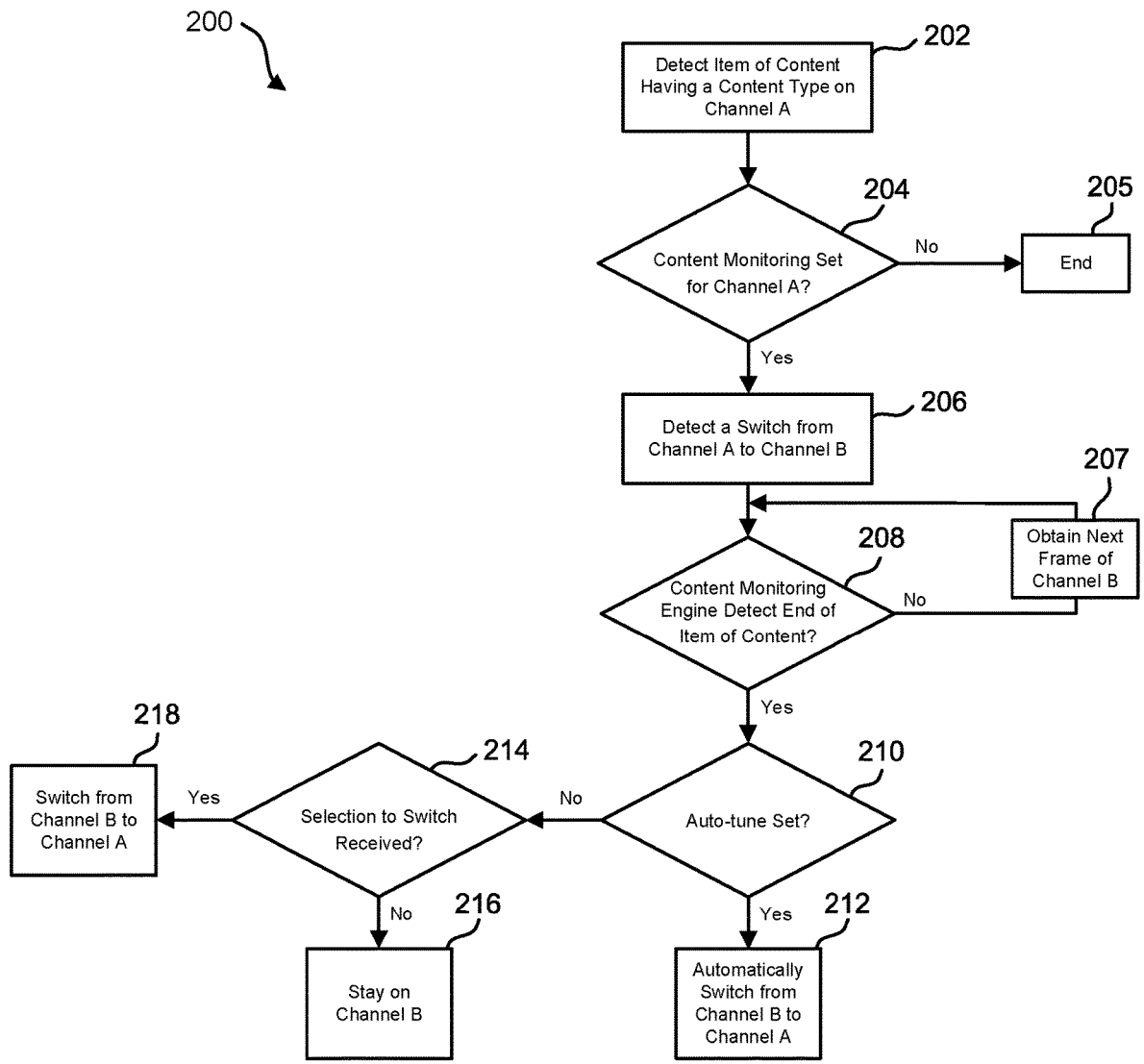
FIG. 2 is a flow diagram illustrating an example of a process for determining completion of media content and performing one or more functions based on determining completion of the media content, in accordance with some examples.

As shown in FIG. 1, the media device 102 includes a channel change detection engine 104, a content monitoring engine 106, and a tuning engine 108. In some cases, the media device 110 can also include a channel change detection engine, a content monitoring engine, and a tuning engine. Operations of the media device 102 will be described with respect to FIG. 2. FIG. 2 is a flow diagram illustrating an example of a process 200 for determining completion of media content and performing one or more functions based on determining completion of the media content. The operations of FIG. 2 will be described with respect to the media device 102 performing content completion detection and outputting a notification (e.g., using a display and/or speaking of the media device 102) and/or automatically tuning or changing the media device 102 to a different channel. However, one of ordinary skill will appreciate that the operations of FIG. 2 can be performed by the media device 102 to outputting a notification to the media device 110 and/or automatically tuning or changing the media device 110 to a different channel.

At operation 202, the process 200 includes detecting an item of media content having a content type on channel A. Channel A is a channel to which the media device 102 (or media device 110 in some cases) is currently tuned. For instance, the content monitoring engine 106 can determine that an item of media content has started (or began) on channel A and that the item of media content is a particular type of media content, such as third-party content, informational content, or other type of content. In one illustrative example, the particular type of media content is an advertisement. In another illustrative example, the particular type of media content is a public service announcement. In other examples, the particular type of media content can include any content that is repetitive in nature. As described in more detail herein, the content monitoring engine 106 can include a change determination engine, a machine learning system, and a content type determination engine, which can be used to determine whether the content of channel A is the particular type of content (e.g., third party content, etc.).

Upon detecting that the item of media content is of the particular type (e.g., upon detecting that third party content has begun), the process 200 includes determining whether content monitoring has been set for channel A. For example, once the media device 102 detects that the media content of the particular type has started, the media device 102 can output a notification requesting the user to provide input indicating whether the user wants the content monitoring to be performed in the event the user switches channels. In one example, the media device 102 can display the notification using a display of the media device 102 and/or can output the notification as an audio output using one or more speakers of the media device 102. In some examples, the notification can be output in response to detecting a switch from channel A to a different channel (e.g., as performed at operation 206). In some examples, the media device 102 can automatically perform the content monitoring without requiring input from the user. In such examples, the operation 204 can automatically determine that content monitoring has been set.

The user can provide input accepting the content monitoring (in which case operation 204 will determine that content monitoring has been set) or declining the content monitoring option. If the user provides input declining the content monitoring option, the process 200 can end the process 200 at operation 205. In the even the user provides input accepting the content monitoring option, the process 200 proceeds to operation 206 (or operation 208 in cases when the notification is output after detecting a channel change at operation 206).

At operation 206, the process 200 includes detecting that a switch from channel A to a different channel B has occurred. For example, the channel change detection engine 104 can determine when the media device 102 (or the media device 110 in some cases) has changed channels. In some examples, the channel change detection engine 104 can determine that a channel change has occurred using a machine learning system (e.g., one or more neural networks and other parameters such as segmentation). Once system will get the output from the model (e.g., the one or more neural networks and other parameters), a channel change may occur. The channel change can trigger the user interface and a change to happen through a media player. When access to the channel change is available, the process 200 can piggyback off of the channel change event to determine when a channel change has occurred. As noted above, in some cases, the media device can output the notification requesting a user to set or decline content monitoring in response to detecting a switch from channel A to a different channel (e.g., to channel B). In response to determining that the content monitoring being is set and the channel change from channel A to channel B has occurred, the process 200 (e.g., using the content monitoring engine 106) performs content monitoring. For example, at operation 208, the process 200 can detect whether the end of the item of media content detected at operation 202 has ended. For a given frame, if the end of the item of media content has not been detected at operation 206, the process 200 obtains a next frame of the media content presented on channel B at operation 207. The process 200 can continuously (for every frame) or periodically (every interval of frames, such as every second frame, fifth frame, every tenth frame, etc.) monitor the frames of the media content presented on channel B until the end of the item of media content is detected at operation 206.

Once the process 200 determines (at operation 206) that the item of content having the content type (e.g., the item of third-party content, the informational content, etc.) has ended, the process 200 can determine (at operation 210) whether an auto-tune setting has been set or activated. The auto-tune setting can include automatically changing the channel from the current channel to which the media device 102 is tuned (e.g., channel B) to the channel on which the item of media content having the type was detected (e.g., channel A). For example, the tuning engine 108 can determine whether the user has provided input. In some cases, the user can provide input activating or deactivating the auto-tune setting as the process 200 is performed (e.g., in response to a notification displayed or otherwise output after operation 208 determines the item of media content has ended). In some cases, the user can provide input activating or deactivating the auto-tune setting before the process 200 is performed, such as using a settings menu of the media device 102 or the media device 110.

If, at operation 210, the process 200 determines that the auto-tune setting is activated, the process automatically switches or tunes from channel B to channel A. For example, the tuning engine 108 can cause the media device 102 (or the media device 110 in some cases) to switch from channel B to channel A. In the event the process 200 determines at operation 210 that the auto-tune setting has not been set or activated, the process 200 can proceed to operation 214. At operation 214, the process 200 can determine whether the user has provided input indicating that the user would like the media device 102 (or the media device 110 in some cases) to switch from channel B to channel A. For instance, the media device 102 can output a notification (e.g., a visual notification using a display and/or an audible notification using one or more speakers) prompting the user to provide input indicate whether the user wants to switch back to channel A. The notification can also indicate that the item of media content having the content type has ended. In one illustrative example, the media device can output a message (on a display of the media device 102 or the media device 110) that "The advertisement on channel A has ended. Would you like to switch back to channel A to finish your show?").

If input is received indicating that the user wants to switch to channel A, the process 200 switches from channel B to channel A at operation 218. Otherwise, if input is received indicating that the user does not want to switch to channel A, the process 200 remains on channel B at operation 216. In some cases, if no input is received by the user, the process 200 remains on channel B or can automatically tune to channel A (e.g., regardless of whether the auto-tune setting has been activated).

Figure 3:
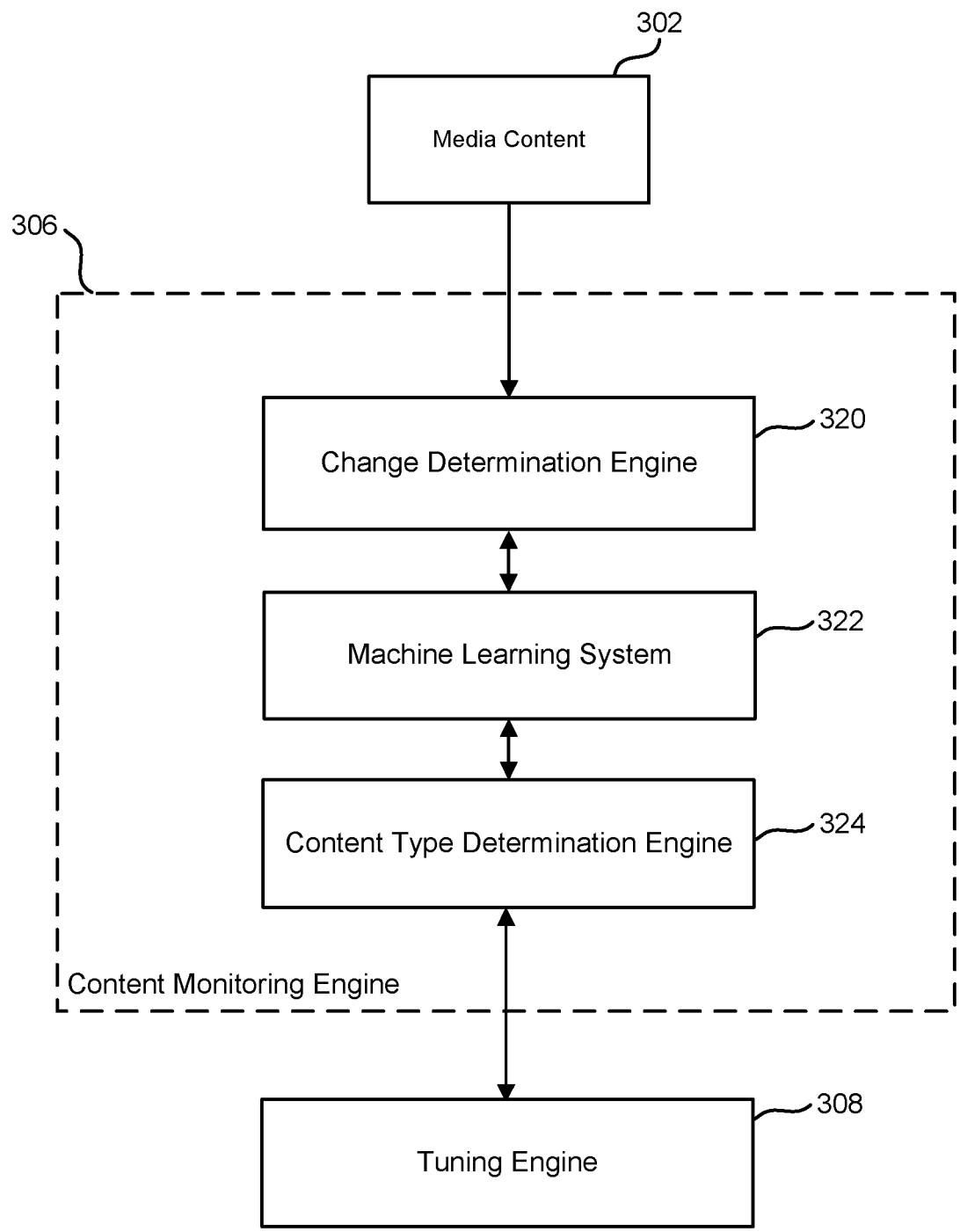
FIG. 3 is a block diagram illustrating example components of a content monitoring engine, in accordance with some examples.

As noted above, the content monitoring engine 106 can include a change determination engine, a machine learning system, and a content type determination engine for performing content monitoring (e.g., at operation 208 of the process 200 shown in FIG. 2). FIG. 3 is a block diagram illustrating an example of a content monitoring engine 306. The content monitoring engine is an example implementation of the content monitoring engine 106. As shown, the content monitoring engine 306 includes a change determination engine 320, a machine learning system 322, and a content type determination engine 324. The content monitoring engine 306 receives as input media content 302. In one illustrative example, the media content 302 can be received from the media source 101. In one illustrative example, the media content 302 can be received from another device (e.g., from the media device 102 or the media device 110). A tuning engine 308 is also shown, which can perform the functions described above with respect to the tuning engine 108 (e.g., performing auto-tuning, output one or more notifications, etc.).

In some examples, operation of the change determination engine 320, the machine learning system 322, and/or the content type determination engine 324 can be implemented using a CPU, a GPU, and/or other processing device or unit. In some cases, the machine learning system 322 can leverage the architectures of a CPU, DSP, GPU, and the NPU or NPE of the media device 102 to dynamically determine the best means to run the machine learning architecture (e.g., one or more neural networks), while optimizing metrics such as latency, throughput, battery, memory, CPU, among others. In one illustrative example, the operations of the machine learning system 322 can be implemented using a NPE that can run one or more neural networks, a GPU, and/or a DSP.

Figure 5:
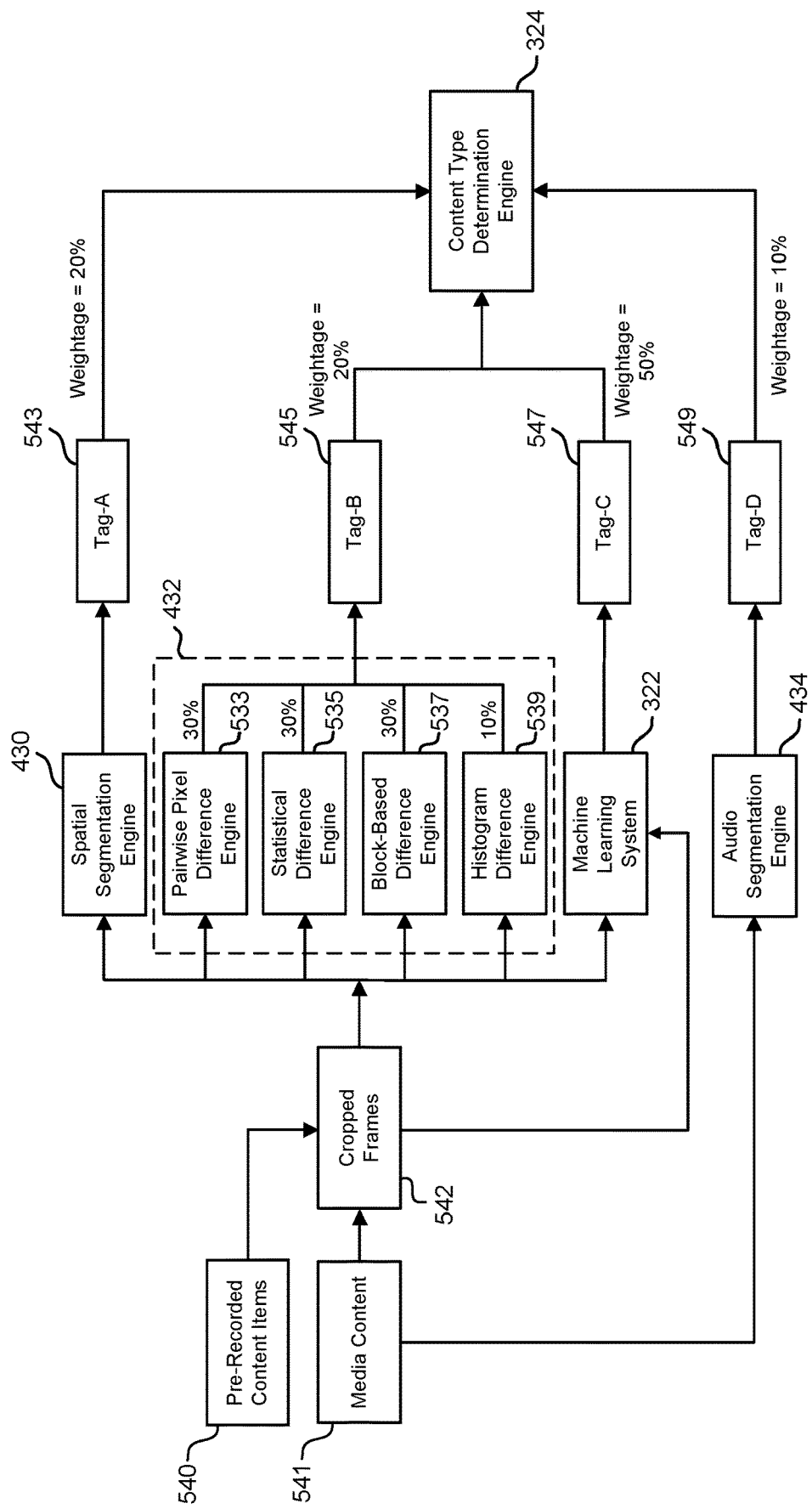
FIG. 5 is a block diagram illustrating an example implementation of a system for determining completion of media content, in accordance with some examples.

Operations of the change determination engine 320, the machine learning system 322, and the content type determination engine 324 are described with respect to an example implementation shown in FIG. 5. In the example implementation of FIG. 5, media content 541 is input for processing by components of the content monitoring engine 306. In some examples, the video frames of the media content 541 are cropped, resulting in cropped frames 542. The cropped frames 542 can include a subset of all of the frames of the media content 541. In some examples, the media content 541 includes encoded content (e.g., compressed using one more video coding Standard-based techniques, such as high efficiency video coding (HEVC), versatile video coding (VVC), moving picture experts group (MPEG), and/or other video coding technique). In such examples, the cropped frames 542 can include only intra-predicted coded frames (I-frames) of the media content 541 (thus excluding any frames that are encoded using inter-prediction, such as bi-predicted (B) frames or uni-predicted (P) frames). For instance, two frames that are compared to one another by the change determination engine 320 and/or the machine learning system 322 can include consecutive I-frames in a sequence of frames of the media content 541. In some examples, the media content 541 includes unencoded content (e.g., after the media content has been decoded, prior to being encoded, or content that has not been encoded). In such examples, the cropped frames 542 can include every N-th frame of the media content, where N is equal to an integer value greater than 1, such as a value of 5, 10, 15, 20, 30, etc. In some examples, all video frames of the media content 541 can be processed by the content monitoring engine 306.

The change determination engine 320 can include one or more components that can be used to determine when a change in media content has occurred on a channel (e.g., based on whether one or more frames of the media content have changed relative to other frames of content). For example, the change determination engine 320 can compare one or more characteristics of two media frames of media content (e.g., two video frames of a video being presented by the media device 102 on a given channel, two audio frames of audio content being output by the media device 102, etc.) to determine whether a change has occurred between the two media frames. The determined change can indicate whether the scene of displayed media content has changed enough to indicate that an item of media content having a given type may have started or ended. Examples of characteristics include characteristics of the background and/or foreground (e.g., objects) of the media frames, pixel characteristics (e.g., a pixel-by-pixel level, a block-level, etc.) of the media frames, statistical characteristics of the media frames, characteristics defined by histograms generated for the media frames, any combination thereof, and/or other characteristics. In some cases, the change determination engine 320 can determine whether a significant change has occurred (based on a given characteristic) based on the change being above one or more change thresholds. Detection of such a significant change indicates that media content of the given type may have started or ended. The change determination engine 320 can generate one or more tags indicating whether a significant change has occurred (e.g., above a given change threshold) based on a comparison of the one or more characteristics. The tags can be output to the content type determination engine 324, which can use the tags to determine whether the media content of the given type has started or ended. Example components of the change determination engine 320 are described below with respect to an example change determination engine 420 in FIG. 4.

Figure 4:
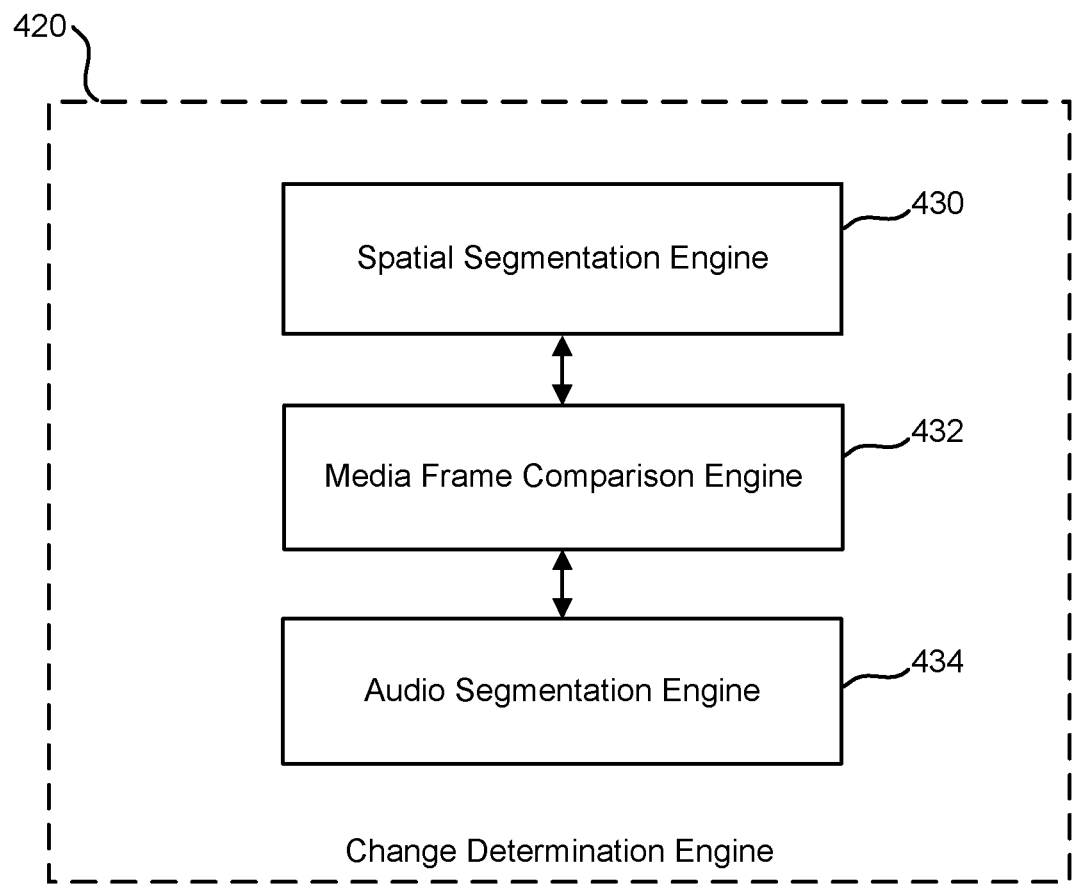
FIG. 4 is a block diagram illustrating example components of a change determination engine, in accordance with some examples.

FIG. 4 a block diagram illustrating an example of a change determination engine 420, which is an example implementation of the change determination engine 320. As shown, the change determination engine 420 includes a spatial segmentation engine 430, a media frame comparison engine 432, and an audio segmentation engine 434. In some examples, the change determination engine 420 can have other components for determining a likelihood of whether a change has occurred between frames of media content. While examples are described below as comparing characteristics of two frames, similar operations can be performed to compare features of any number of frames (e.g., by comparing characteristics of a third frame with characteristics of a first frame and a second frame).

The spatial segmentation engine 430 can perform spatial segmentation on one or more frames of media content (e.g., media content received from the media source 101 of FIG. 1). Any type of spatial segmentation can be performed by the spatial segmentation engine 430, such as computer-vision based segmentation, machine learning-based segmentation (e.g., using one or more neural networks), or other type of segmentation. For example, spatial segmentation engine 430 can perform spatial segmentation on a first frame of the media content and on a second frame of the media content in order to segment the first and second frames into a background region and one or more foreground regions. For example, referring to FIG. 5, the spatial segmentation engine 430 can obtain two frame from the cropped frames 542, and can perform spatial segmentation on the two frames in order to segment the frames into background and foreground regions. As noted above, the two frames can include consecutive I-frames of the media content 541 (in which case the media content 541 is encoded media content), can include frames separated by a duration (e.g., the duration can be equal to the number of frames between every N-th frame, as noted above), or other frames from the media content 541. In some cases, the two frames can include consecutive frames from the full sequence of frames of the media content 541.

The spatial segmentation engine 430 can use the segmentation to determine whether the scene of displayed media content has changed enough to indicate that an item of media content having a given type may have started or ended. For example, the spatial segmentation engine 430 can compare the background region and/or the one or more foreground regions of the second media frame to the background region and/or the one or more foreground regions of the first media frame to determine a change has occurred in the second frame relative to the first frame. In some cases, the spatial segmentation engine 430 can compare an amount of the change between the first frame and the second frame to a segmentation change threshold. For example, if only the foreground is different between the two frames, the spatial segmentation engine 430 can determine that the change is below the segmentation change threshold. However, if the spatial segmentation engine 430 determines that the foreground and background are different between the two frames, the spatial segmentation engine 430 can determine that the change is greater than the segmentation change threshold.

The spatial segmentation engine 430 can output a tag with a weight that is based on whether the spatial segmentation engine 430 detects a change less than or greater than the segmentation change threshold. For example, if the spatial segmentation engine 430 detects a change between two frames that is less than the segmentation change threshold (e.g., based on only the foreground being different between the two frames or detecting that neither the foreground nor the background are different), the spatial segmentation engine 430 can output a tag that has a value of 0. In another example, if the spatial segmentation engine 430 detects a change between two frames that is greater than the segmentation change threshold (e.g., based on the foreground and the background being different between the two frames), the spatial segmentation engine 430 can output a tag that has a value greater than 0, such as 0.2, 0.3, or other suitable value. In the example implementation shown in FIG. 5, the spatial segmentation engine 430 outputs a tag-A 543 having a value of 0.2 (corresponding to a weight of 20%). As shown in FIG. 5, the tag-A 543 is output to the content type determination engine 324.

In one illustrative example, a news show may be displayed on given channel to which a media device is tuned. In a first frame, a news anchor is sitting at a desk and is discussing a current event. The spatial segmentation engine 430 can perform semantic segmentation on the first frame, resulting in the news anchor, the desk, and other objects being segmented as foreground from the first frame and a portion of the scene behind the news anchor, desk, etc. being segmented as background from the first frame. In a second frame (e.g., occurring after the first frame), the camera view may switch to a different news anchor, but the background remains the same or similar as that depicted in the first frame. The spatial segmentation engine 430 performs semantic segmentation on the second frame to segment the different news anchor, the desk, and other objects as foreground and the rest of the scene as background. The spatial segmentation engine 430 can compare the pixels of the segmented foreground and background regions of the second frame to the segmented foreground and background regions of the first frame. Based on the comparison, the spatial segmentation engine 430 can determine that the foreground of the two frames is different, but that the background is similar or the same. The spatial segmentation engine 430 can thus determine that the difference between the segmented foregrounds and backgrounds of the frames is below the segmentation change threshold. For instance, while there may be a large difference between the foreground objects in the two frames, the similarity of the backgrounds in the two frames may cause the change between the two frames to be below the segmentation change threshold. In a third frame (e.g., occurring after the second frame), an item of third-party content (e.g., an advertisement) may be presented, in which case both the foreground and the background changes. The spatial segmentation engine 430 can compare the pixels of the segmented foreground and background of the third frame to the segmented foreground and background of the second frame and determine that both the foreground and the background are different between the two frames. Based on the comparison, the spatial segmentation engine 430 can determine that the difference between the segmented foregrounds and backgrounds of the two frames is greater than the segmentation change threshold. The spatial segmentation engine 430 can then output a tag having a value greater than 0 (e.g., the value of 0.2 for the tag-A 543 of FIG. 5).

As noted above, the change determination engine 320 also includes the media frame comparison engine 432. The media frame comparison engine 432 can compare characteristics of one or more frames of the media content to one or more other frames of the media content to determine whether a change has occurred between the frames. For example, the media frame comparison engine 432 can determine an amount of change in the characteristics of a second frame relative to a first frame. The media frame comparison engine 432 can compare the amount of change to one or more change thresholds. In some examples, the media frame comparison engine 432 can determine multiple characteristics of a frame and can compare the multiple characteristics determined for the frame to the same multiple characteristics determined for a previous frame. Examples of the characteristics can include a pixel-level characteristic of a frame (e.g., a characteristic of a given pixel in a frame), a statistical characteristic of a frame, a block-level characteristic of a frame (e.g., a characteristic of a block of pixels in a frame), a color histogram generated for a frame, any combination thereof, and/or other characteristics.

In some examples, the media frame comparison engine 432 can include a pairwise pixel difference engine 533 (shown in FIG. 5). The pairwise pixel difference engine 533 can perform a pairwise pixel comparison between pixels of a second frame and pixels of a first frame occurring prior to the second frame (corresponding to pixel-level characteristics of the two frames). For instance, the pairwise pixel difference engine 533 can perform the pairwise pixel comparison by comparing each pixel of the second frame with a corresponding pixel of the first frame. Corresponding pixels in the two frames refers to pixels having a common position or location in the two frames. For example, a value (e.g., a pixel value between 0 and 255, inclusive) of the top-left most pixel (at a position (0, 0)) in the second frame can be compared to a value of the corresponding top-left most pixel (at a position (0, 0)) in the first frame, a value of a pixel in the top row and second column (at position (0, 1)) in the second frame can be compared to a value of the corresponding pixel in the top row and second column (at position (0, 1)) in the first frame, and so on. In some cases, all pixels in the second frame can be compared to all pixels in the first frame. In some cases, a subset of all of the pixels in the second frame can be compared to a subset of all of the pixels in the first frame.

The pairwise pixel difference engine 533 can use the pairwise comparison of the pixels to determine whether there is a significant change between frames. For instance, the pairwise pixel difference engine 533 can determine whether a difference or differences between the pixels is greater than a pixel change threshold. The pixel change threshold can include any suitable value, such as a value of 10, 20, 30, or other value out of a scale between 0 and 255. In one example, the pairwise pixel difference engine 533 can determine a difference between each pixel in the second frame and each corresponding pixel in the first frame, and can determine a count of the number of pixel pairs that are different by more than the pixel change threshold. If the count of the number of pixel pairs that are different by more than the pixel change threshold is greater than a pixel count threshold, then the pairwise pixel difference engine 533 can determine that a significant change has occurred in the second frame relative to the first frame. The pixel count threshold can include any number of pixels, such as 500, 1000, 1500, or other vale. In some cases, the pixel count threshold can be a function of the frame resolution, such as 50% of the frame resolution, 75% 50% of the frame resolution, or other percentage.

In some cases, when the pairwise pixel difference engine 533 determines that a significant change has occurred (based on the count of the number of pixel pairs that are different by more than the pixel change threshold being greater than the pixel count threshold), the pairwise pixel difference engine 533 can output a value greater than 0, such as 0.2, 0.3, or other suitable value. For example, referring to FIG. 5, the pairwise pixel difference engine 533 can output a value of 0.3 (corresponding to a weight of 30%). When the pairwise pixel difference engine 533 determines that a significant change has not occurred (based on the count of the number of pixel pairs that are different by more than the pixel change threshold being less than the pixel count threshold), the pairwise pixel difference engine 533 can output a value of 0.

In some examples, the media frame comparison engine 432 can include a statistical difference engine 535 (shown in FIG. 5). The statistical difference engine 535 can perform a statistical pixel comparison between pixels of the second frame and pixels of the first frame (corresponding to statistical characteristics of the two frames). In one example, the statistical difference engine 535 can compare an average of all pixels of the second frame with an average of all pixels of the first frame. In another example, the statistical difference engine 535 can compare a representative value (e.g., an average or other value) of a group of pixels in the second frame with a corresponding group of pixels in the first frame. For instance, for each pixel in a frame (referred to as a center pixel), the statistical difference engine 535 can determine an average value for the center pixel and a group of pixels surrounding the center pixel (referred to as a neighborhood of the center pixel). In some examples, the neighborhood of a center pixel can include each pixel that is adjacent to the center pixel (e.g., the pixel above, below, to the left, to the right, to the top-right, to the bottom-right, to the bottom-left, and to the top-left of the center pixel). In some examples, the neighborhood of a center pixel can include the pixels to the left, right, above, and below the center pixel. Any other neighborhood of pixels can be used to determine a representative value for the pixel (e.g., by determining an average of the neighborhood of pixels). In one illustrative example, for a center pixel located at position (2, 3) in a frame (corresponding to the third row and the fourth column in the frame), the neighborhood of pixels surrounding the center pixel can include eight pixels located at positions (1, 2), (1, 3), (1, 4), (2, 4), (3, 4), (3, 3), (3, 2), and (2, 2).

As noted above, a representative value can be determined for a center pixel and the neighborhood of the center pixel. For instance, the statistical difference engine 535 can determine an average value using the value of the center pixel and the values of the eight surrounding pixels. The average value can be used as a representative value for the center pixel. The statistical difference engine 535 can determine representative values for each pixel in the second image and for each pixel in the first image. The statistical difference engine 535 can compare each representative value determined for each pixel in the second image to each representative value determined for each corresponding pixel in the first image. For example, a representative value determined for the top-left most pixel (at a position (0, 0)) in the second frame can be compared to a representative value determined for the corresponding top-left most pixel (at a position (0, 0)) in the first frame, a representative value determined for a pixel in the top row and second column (at position (0, 1)) in the second frame can be compared to representative value determined for the corresponding pixel in the top row and second column (at position (0, 1)) in the first frame, and so on.

The statistical difference engine 535 can use the statistical comparison of the pixels to determine whether there is a significant change between frames. For instance, the statistical difference engine 535 can determine whether a difference or differences between the average of the entire frame or the representative values of the pixels is greater than a statistical change threshold. The statistical change threshold can include any suitable value, such as a value of 10, 20, 30, or other value out of a scale between 0 and 255. In one example, the statistical difference engine 535 can determine a difference between the average value determined for the entire second frame (the average value of all pixels in the second frame) and the average value determined for the entire first frame (the average value of all pixels in the first frame). The statistical difference engine 535 can determine whether the difference in average values is greater than the statistical change threshold. If the difference in average values of the first and second frames is greater than the statistical change threshold, then the statistical difference engine 535 can determine that a significant change has occurred.

In another example, the statistical difference engine 535 can determine a difference between each representative value for each pixel in the second frame and each representative value for each corresponding pixel in the first frame and can determine a count of the number of representative values that are different by more than the statistical change threshold. In the event the statistical difference engine 535 determines that the count of the number of representative values that are different by more than the pixel change threshold is greater than the pixel count threshold, the statistical difference engine 535 can determine that a significant change has occurred.

In some cases, when the statistical difference engine 535 determines that a significant change has occurred (e.g., based on the average values of the two frames or based on the pixel count threshold), the statistical difference engine 535 can output a value greater than 0, such as 0.2, 0.3, or other suitable value. For example, referring to FIG. 5, the statistical difference engine 535 can output a value of 0.3 (corresponding to a weight of 30%). When the statistical difference engine 535 determines that a change has not occurred (based on the average values of the two frames or based on the pixel count threshold), the statistical difference engine 535 can output a value of 0.

In some examples, the media frame comparison engine 432 can include a block-based difference engine 537 (shown in FIG. 5). The block-based difference engine 537 can perform a block-based pixel comparison between blocks of the second frame and blocks of the first frame (corresponding to block-level characteristics of the two frames). For instance, each frame of the received media content can be partitioned or divided into blocks. Any suitable partition can be used, such blocks having a size of 4 pixels-by-4 pixels (denoted as 4×4), 8×8, 16×16, 32×32, and/or other sizes. In one illustrative example, the block-based difference engine 537 can partition the frames into a fixed number of block regions, with every frame in the media content (or at least the frames that are being compared) being partitioned into the same fixed number of regions. The block-based difference engine 537 can determine a likelihood ratio for each block of pixels in the second frame to a corresponding block of pixels (having a same common location) in the first frame. The likelihood ratio provides an indication of whether two corresponding blocks from two frames have similarity (with a high likelihood ratio indicating a high likelihood of similarity and a low likelihood ratio indicating a low likelihood of similarity). For example, a high value of a likelihood ratio for a particular block implies that there is no change in the pixels during comparison. In some examples, likelihood ratios can be determined for all blocks in a frame. In some examples, likelihood ratios can be determined for less than all of the blocks in a frame. For instance, a likelihood ratio can be determined for each block in each corner of the frame. In such an example, likelihood ratios can be determined for four blocks, including a block in the top-right corner, a block in the top-left corner, a block in the bottom-left corner, and a block in the bottom-right corner). In another example, in addition or as an alternative to the blocks in the four corners, a likelihood ratio can be determined for a block in the center of the frame. In another example, in addition or as an alternative to the blocks in the four corners and/or the block in the middle of the frame, a likelihood ratio can be determined for each block at the mid-point of each length of the frame. In various examples, likelihood ratios can be determined for any other block within a frame.

Any suitable technique can be used to determine a likelihood ratio based on each block of pixels in the second frame and each corresponding block of pixels (in the same location) in the first frame, such as pairwise, statistical, block-based difference, or other technique. For example, using a pairwise technique, the block-based difference engine 537 can determine the number of pixels that have changed in a block of pixels in the second frame as compared to the same corresponding block of pixels in the first frame. As another example, using a statistical difference technique, the block-based difference engine 537 can determine a first average value of all pixels (e.g., after transforming the frames to grayscale) of a block of pixels in the first frame and a second average value of all pixels in the same corresponding block of pixels in the second frame. The block-based difference engine 537 can determine the likelihood ratio using the first and second average values.

The block-based difference engine 537 can use the block-based comparison to determine whether there is a significant change between frames. For instance, the block-based difference engine 537 can determine whether a difference in the likelihood ratio for each block in the second frame and the likelihood ratio for each corresponding block in the first frame is greater than a block change threshold. The block change threshold can include any suitable value. For instance, the likelihood ratio is inversely proportional to dissimilarity. In one illustrative example, the block change threshold can be 0.40 (corresponding to 40%). Other values for the likelihood ratio can be used, such as a value of 0.1, 0.2, 0.3, or other value. If the difference in likelihood ratios for a threshold number of blocks of the first and second frames is less than the block change threshold, then the block-based difference engine 537 can determine that a significant change has occurred. In some examples, the threshold number of blocks can include at least half of the blocks, more than half of the blocks, a majority of the blocks, 75% of the blocks, or other number of blocks.

In some cases, when the block-based difference engine 537 determines that a significant change has occurred (e.g., based on the difference in likelihood ratios for the threshold number of blocks of the first and second frames being greater than the block change threshold), the block-based difference engine 537 can output a value greater than 0, such as 0.2, 0.3, or other suitable value. For example, referring to FIG. 5, the block-based difference engine 537 can output a value of 0.3 (corresponding to a weight of 30%). When the block-based difference engine 537 determines that a change has not occurred (e.g., based on the difference in likelihood ratios not being greater than the block change threshold for the threshold number of blocks of the first and second frames), the block-based difference engine 537 can output a value of 0.

In some examples, the media frame comparison engine 432 can include a histogram difference engine 539 (shown in FIG. 5). The histogram difference engine 539 can perform a color histogram-based comparison between the second frame and the first frame. A color histogram is a discretized representation of the color distribution of a frame or image. The histogram difference engine 539 can determine a first color histogram for the first frame and a second color histogram for the second frame. The histogram difference engine 539 can count a number of pixels of the first fame that fall within each discretized color value (or bin) of the first histogram and can count a number of pixels of the second fame that fall within each discretized color value (or bin) of the second histogram.

The histogram difference engine 539 can use the color histogram-based comparison to determine whether there is a significant change in the second frame relative to the first frame. For instance, the histogram difference engine 539 can compare the number of pixels within each bin of the second color histogram with the number of pixels within each bin of the first color histogram. The histogram difference engine 539 can determine whether a difference in the number of pixels in the various bins of the second histogram and the number of pixels in the various bins of the first histogram is greater than a histogram change threshold. The histogram change threshold can include any suitable value representing how many pixels are within a bin. For instance, the histogram provides a discretized representation of the color distribution of a frame or image. For each discretized color value (or bin), the number of pixels that fall within that bin are counted. A significant change can be determined based on the number of pixels that fall within a bin for the two frames. If the difference in the number of pixels in the bins of the second histogram and the number of pixels in the various bins of the first histogram is greater than the histogram change threshold, the histogram difference engine 539 can determine that a significant change has occurred.

In some cases, when the histogram difference engine 539 determines that a significant change has occurred (e.g., based on the difference in the number of pixels in the bins of the second histogram and the number of pixels in the various bins of the first histogram being greater than the histogram change threshold), the histogram difference engine 539 can output a value greater than 0, such as 0.2, 0.3, or other suitable value. For example, referring to FIG. 5, the histogram difference engine 539 can output a value of 0.1 (corresponding to a weight of 10%). When the media frame comparison engine 432 determines that a change has not occurred (e.g., based on the difference in the number of pixels in the bins of the second histogram and the number of pixels in the various bins of the first histogram being less than the histogram change threshold), the media frame comparison engine 432 can output a value of 0.

As illustrated in FIG. 5, the media frame comparison engine 432 outputs a tag-B 545 indicating whether a significant change has occurred in the second frame relative to the first frame. The media frame comparison engine 432 determines a value of the tag-B 545 based on the values output by the pairwise pixel difference engine 533, the statistical difference engine 535, the block-based difference engine 537, and the histogram difference engine 539 (collectively referred to as engines 533-539). The highest possible combined value of the values output by the engines 533-539 is a value of 1 (corresponding to 100%). The media frame comparison engine 432 can set the value of the tag-B 545 to a value greater than 0 when the combined value of the values output by the engines 533-539 exceeds a combined change threshold. The combined change threshold can be any suitable value, such as 0.5, 0.6, 0.75, 0.8, or other value. For example, if the combined change threshold is a value of 0.75, the values output by the engines 533-539 must add up to at least a combined value 0.75 for the media frame comparison engine 432 to generate a positive value for the tag-B 545. In the example shown in FIG. 5, the combined value from the engines 533-539 of the media frame comparison engine 432 equals 1 (based on all of the engines 533-539 outputting values greater than 0), in which case the media frame comparison engine 432 outputs the tag-B 545 having a value of 0.2 (corresponding to a weight of 20%) due to the combined change threshold being exceeded. As shown in FIG. 5, the tag-B 545 is output to the content type determination engine 324. In the event the combined value from the engines 533-539 of the media frame comparison engine 432 was less than the combined change threshold (e.g., below a value of 0.75), the media frame comparison engine 432 would output the tag-B 545 with a value of 0.

As noted above, the change determination engine 320 may also include the audio segmentation engine 434. As shown in FIG. 5, the media content 541 is provided to the audio segmentation engine 434. In some cases, only the audio portion of the media content 541 is provided to the audio segmentation engine 434. The audio segmentation engine 434 can segment the audio data of the media content using an audio segmentation technique. The audio segmentation engine 434 can determine when the audio characteristics of a segment of the media content change by a significant amount as compared to the audio characteristics of a previous segment. For example, the audio segmentation engine 434 can compare segments of certain durations (referred to as audio frames) to previous audio frames. In some cases, the audio segmentation engine 434 can extract audio or speech-based features from each audio frame of the media content. The features can include Mel-frequency cepstral coefficients, Gammatone-frequency cepstral coefficients, Linear-prediction cepstral coefficients, Bark-frequency cepstral coefficients, Power-normalized cepstral coefficients, or other coefficients that represent the speech characteristics of the audio frames. In general, the spectrum is the Fourier transform of a signal. The Fourier transform converts a time-domain signal to the frequency domain, in which case the spectrum is the frequency domain representation of the audio time-domain signal. A cepstrum is determined by taking the log magnitude of the spectrum, followed by an inverse Fourier transform.

The audio segmentation engine 434 can compare the features (e.g., the Mel-frequency cepstral coefficients or other coefficients) of a second audio frame to the features of the first audio frame that occurs before the second audio frame. The audio segmentation engine 434 can determine whether a difference in the features of the second frame and the features of the first frame is greater than an audio change threshold. The audio change threshold can include any suitable value representing a change in audio or speech characteristics. For example, the threshold values can be determined based on the maximum and minimum values of the audio features. An example of an audio change threshold can include 10. If the difference in the features of the second frame and the features of the first frame is greater than the audio change threshold, the audio segmentation engine 434 can determine that a significant change has occurred.

The audio segmentation engine 434 can output a tag with a weight that is based on whether the audio segmentation engine 434 detects a change less than or greater than the audio change threshold. For example, when the audio segmentation engine 434 determines that a significant change has occurred (e.g., based on the difference in the features of the second frame and the features of the first frame being greater than the audio change threshold), the audio segmentation engine 434 can output a tag that has a value greater than 0, such as 0.2, 0.3, or other suitable value. For example, referring to FIG. 5, the audio segmentation engine 434 can output a tag-D 549 with a value of 0.1 (corresponding to a weight of 10%). When the audio segmentation engine 434 determines that a change has not occurred (e.g., based on the difference in the features of the second frame and the features of the first frame being less than the audio change threshold), the audio segmentation engine 434 can output a tag with a value of 0. As shown in FIG. 5, the tag-D 549 is output to the content type determination engine 324.

Returning to FIG. 3, the machine learning system 322 of the content monitoring engine 306 can be trained to determine or estimate whether an item of media content is a particular type of content (e.g., third party content, informational content, etc.). The machine learning system 322 can include any type of machine learning system, such as a convolutional neural network (CNN), a Siamese CNN, an autoencoder, a deep belief neural network (DBN), a Recurrent Neural Network (RNN), a Generative Adversarial Network (GAN), any combination thereof, and/or any other suitable neural network. An example of a CNN is described below with respect to FIG. 6. An example of a Siamese CNN is described below with respect to FIG. 7.

In some examples, the machine learning system 322 can determine a probability or likelihood that a frame of media content on a given channel is of a particular type of media content (e.g., whether the media content is third party content, informational content, etc.). For instance, the machine learning system 322 can include a classification neural network (e.g., using a CNN or Siamese CNN architecture, such as that shown in FIG. 6 or FIG. 7) that determines probabilities that a frame is associated with each of a plurality of classes. One or more of the classes the machine learning system 322 is trained to classify is one or more particular types of content (e.g., a class for third party content and/or a class for informational content). For instance, during inference (after the machine learning system 322 has been trained and is being used for processing real-time input data), the machine learning system 322 can process the second frame and output a probability that the frame is associated with each of the plurality of classes (e.g., a first probability that the second frame includes third party content, a second probability that the second frame includes informational content, a third probability that the frame includes movie content, etc.). The pre-recorded content items 540 can be used to train the machine learning system 322.

In some cases, the machine learning system 322 can determine whether a probability associated with a particular class (e.g., a probability for third party content and/or a probability for informational content) is above a probability threshold. The machine learning system 322 can generate a tag indicating whether the probability for second frame is greater than the probability threshold. In the example implementation shown in FIG. 5, the machine learning system 322 outputs a tag-C 547 having a value of 0.5 (corresponding to a weight of 20%). For example, the machine learning system 322 can determine that a probability that the second frame includes media content of the particular type is above the probability threshold. Based on determining the probability for the second frame is above the probability threshold, the machine learning system 322 outputs the tag-C 547 with the value of 50%. In the event the machine learning system 322 determines the probability of the second frame including media content of the particular type is below the probability threshold, the machine learning system 322 can output the tag-C 547 with a value of 0. As shown in FIG. 5, the tag-C 547 is output to the content type determination engine 324.

The content type determination engine 324 can receive one or more tags output by the change determination engine 320 and the machine learning system 322. For instance, as shown in FIG. 5, the content type determination engine 324 receives tag-A 543 from the spatial segmentation engine 430, tag-B 545 from the media frame comparison engine 432, tag-C 547 from the machine learning system 322, and tag-D 549 from the audio segmentation engine 434 (collectively referred to as tags 543-549). The content type determination engine 324 can use the one or more tags to determine whether a content change has occurred from the first frame to the second frame. For example, the highest possible combined value of the tags 543-549 is a value of 1 (corresponding to 100%). The content type determination engine 324 can compare the combined value of the tags 543-549 to a content change threshold. The content change threshold can be any suitable value, such as 0.5, 0.6, 0.75, 0.8, 0.9, or other value. For example, if the content change threshold is a value of 0.8, the combined value of the tags 543-549 must add up to at least a combined value 0.8 for the content type determination engine 324 to determine that a change in content has occurred (e.g., the start of an item of third party content or the end of an item of third party content). In the example shown in FIG. 5, the combined value of the tags 543-549 equals 1 (based on all of the tags 543-549 having values greater than 0). In the example of FIG. 5, the content type determination engine 324 determines that a content change has occurred due to the combined value of the tags 543-549 being greater than the content change threshold. In the event the combined value of the tags 543-549 was less than the content change threshold (e.g., below a value of 0.8), the content type determination engine 324 would determine that a content change has not occurred.

Based on a determined content change, the content type determination engine 324 can determine whether the content change is based on content of the particular type having started (e.g., at operation 202 of the process 200 in FIG. 2) or ended (e.g., at operation 208 of the process 200 in FIG. 2). For example, a media device (e.g., media device 102) can be tuned to a channel that is presenting a movie. The content type determination engine 324 can then detect media content of a particular type (e.g., third party content) has started based on a content change being detected due to the combined value of the received tags (e.g., tags 543-549) being greater than the content change threshold. The content type determination engine 324 can continue monitoring frames of the channel for a content change (e.g., at operation 208 of the process 200 in FIG. 2). Once a content change is detected for a subsequent frame on the channel, the content type determination engine 324 can determine that the media content of the particular type has completed or ended.

In response to determining completion of the type of media content on a given channel, the content type determination engine 324 can cause the tuning engine 308 to automatically switch from a current channel to the channel (e.g., automatically switch from channel B to channel A at operation 212 of FIG. 2) and/or can output a notification (e.g., by displaying a visual notification and/or outputting an audible notification) indicating that the media content of the particular type has ended.

Various use case examples will now be described using the systems and techniques described herein. In a first example, a user is viewing content on a channel A using the media device 102. The user can enable the content monitoring setting so that the content monitoring engine 106 monitors the content on channel A. Third party content (e.g., an advertisement or other content) can then be presented on channel A. The user can cause the media device 102 to change from channel A to a channel B (e.g., which can be detected by the channel change detection engine 104 at operation 206 of the process 200 shown in FIG. 2). While monitoring channel A, the content type determination engine 324 can determine that the tag-A 543, the tag-B 545, and the tag-D 549 indicate that content in a particular frame of the content on channel A has a significant change as compared to a prior frame of the content on channel A. The machine learning system 322 can detect that the particular frame includes the third-party content (e.g., based on a probability or confidence level for the third-party content class being above a threshold). In some cases, the machine learning system 322 can also provide details associated with the third-party content (e.g., information related to the third-party content, such as advertisement details including product information, company information, etc.). For instance, the machine learning system 322 can be aware of the details due to the machine learning system 322 being trained using a pre-existing dataset that includes the third-party content. The third-party content details can be provided to another device or entity (e.g., a website, a set-top box, a television, a mobile device, etc.) using a tagging mechanism, such as by indicating that particular third-party content belongs to a particular category, company, etc. The content type determination engine 324 can determine that the third-party content has begun, and in some cases can share the details of third-party content. The content type determination engine 324 can start a counter and can continue counting for an additional content change determination. Once the content type determination engine 324 determines an additional content change, it can determine that the third-party content has completed. The media device 102 can then either automatically tune back to channel A or can output a notification indicating that the third-party content has completed on channel A, as described above.

In another example, a user is viewing content on a channel A using the media device 102. The user can enable the content monitoring setting so that the content monitoring engine 106 monitors the content on channel A. Third party content (e.g., an advertisement or other content) can then be presented on channel A. The user can cause the media device 102 to change from channel A to a channel B (e.g., which can be detected by the channel change detection engine 104 at operation 206 of the process 200 shown in FIG. 2). A scene change can then occur on channel A as the content type determination engine 324 is monitoring channel A. Based on the scene change, the content type determination engine 324 the tag-A 543, the tag-B 545, and the tag-C 547 can indicate that content in a particular frame of the content on channel A has a significant change as compared to a prior frame of the content on channel A. However, because the change is a scene change and not new content (e.g., third party content), the machine learning system 322 can output a low probability that the particular frame includes the third-party content (e.g., in which case the probability or confidence level for the third-party content class is below a threshold). Based on the low probability, the tag-C 547 will have a value of 0, preventing the content change threshold from being exceeded by the combined value of the tags 543-549. The content type determination engine 324 can thus determine that the content of channel A is not third-party content or other content, in which case the media device 102 (or the media device 110 in some cases) will remain on channel B and/or a notification will not be output.

In another example, a user is viewing content on a channel A using the media device 102, and has enabled the content monitoring setting so that the content monitoring engine 106 monitors the content on channel A. Third party content (e.g., an advertisement or other content) can then be presented on channel A. The user can cause the media device 102 to change from channel A to a channel B (e.g., which can be detected by the channel change detection engine 104 at operation 206 of the process 200 shown in FIG. 2). While monitoring channel A, the content type determination engine 324 can determine that the tag-A 543 and the tag-B 545 indicate that content in a particular frame of the content on channel A has a significant change as compared to a prior frame of the content on channel A. The machine learning system 322 can detect that the particular frame includes the third-party content (e.g., based on a probability or confidence level for the third-party content class being above a threshold). In some cases, the machine learning system 322 can also provide details associated with the third-party content. However, the tag-D 549 can have a value of 0, indicating that no audio-based change has been detected by the audio segmentation engine 434. Because the tag-D 549 has a lower weightage (a weight of 10% in FIG. 5), the combined value of the tags 543-549 will still be a value of 0.9, which can cause the combined value to be greater than the content change threshold (e.g., greater than the content change threshold of 0.8). In such cases, the content type determination engine 324 can determine that the third-party content has begun, and in some cases can share the details of third-party content. The content type determination engine 324 can start a counter and can continue counting for an additional content change determination. Once the content type determination engine 324 determines an additional content change, it can determine that the third-party content has completed. The media device 102 can then either automatically tune back to channel A or can output a notification indicating that the third-party content has completed on channel A, as described above.

As described above, the machine learning system 322 can include one or more neural network systems or architectures. Any suitable neural network can be used by the machine learning system 322. In some cases, the neural network can be a network designed to perform classification (e.g., classifying a video frame as being associated with a particular class or type of content, such as third-party content, informational content, movie content, etc.). Illustrative examples of neural networks that can be used include a convolutional neural network (CNN), a Siamese CNN, a generative adversarial network (GAN), an autoencoder, a deep belief net (DBN), a Recurrent Neural Networks (RNN), or any other suitable neural network.

For instance, a CNN includes an input layer and an output layer, with multiple hidden layers between the input and out layers. The hidden layers of a CNN can include a series of convolutional, nonlinear, pooling (for downsampling), and fully connected layers. A CNN unit (or layer) in a deep CNN-based network can include multiple filters (or neurons), followed by non-linear activations, and then a pooling layer. The pooling layer can compute a statistical aggregate (a maximum, a summation, etc.) over various regions of the input, which can reduce sensitivity to minor, local variations in the input (e.g., in an input frame). Multiple such CNN units or layers can be stacked together, which can be followed by one or more fully connected layers, to form a deep CNN.

Figure 6:
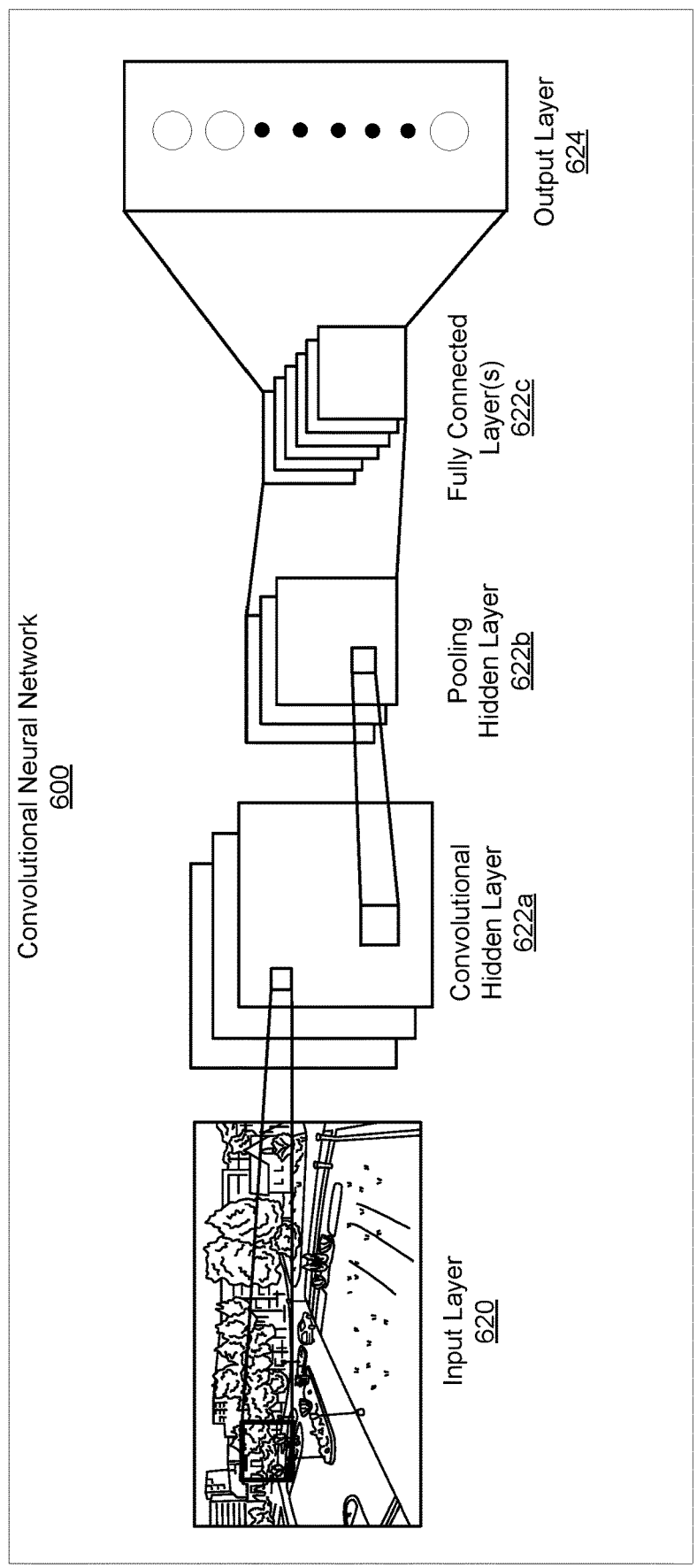
FIG. 6 is a block diagram illustrating an example of a convolutional neural network, in accordance with some examples.

FIG. 6 is an illustrative example of a convolutional neural network 600 (CNN 600). The input layer 620 of the CNN 600 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 622a, an optional non-linear activation layer, a pooling hidden layer 622b, and fully connected hidden layers 622c to get an output at the output layer 624. While only one of each hidden layer is shown in FIG. 6, one of ordinary skill will appreciate that multiple convolutional hidden layers, non-linear layers, pooling hidden layers, and/or fully connected layers can be included in the CNN 600. The output can indicate a single class of content or can include a probability of classes that best describe the content in the image.

The first layer of the CNN 600 is the convolutional hidden layer 622a. The convolutional hidden layer 622a analyzes the image data of the input layer 620. Each node of the convolutional hidden layer 622a is connected to a region of nodes (pixels) of the input image called a receptive field. The convolutional hidden layer 622a can be considered as one or more filters (each filter corresponding to a different activation or feature map), with each convolutional iteration of a filter being a node or neuron of the convolutional hidden layer 622a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 622a. Each connection between a node and a receptive field for that node learns a weight and, in some cases, an overall bias such that each node learns to analyze its particular local receptive field in the input image. Each node of the hidden layer 622a will have the same weights and bias (called a shared weight and a shared bias). For example, the filter has an array of weights (represented by numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 622a is due to each node of the convolutional layer being applied to its corresponding receptive field. For example, a filter of the convolutional hidden layer 622a can begin in the top-left corner of the input image array and can convolve around the input image. As noted above, each convolutional iteration of the filter can be considered a node or neuron of the convolutional hidden layer 622a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 622a. For example, a filter can be moved by a step amount to the next receptive field. The step amount can be set to 1 or another suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 622a.

The mapping from the input layer to the convolutional hidden layer 622a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 622a can include several activation maps in order to identify multiple features in an image. The example shown in FIG. 6 includes three activation maps. Using three activation maps, the convolutional hidden layer 622a can detect three different kinds of features, with each feature being detectable across the entire image.

In some examples, a non-linear hidden layer can be applied after the convolutional hidden layer 622a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 600 without affecting the receptive fields of the convolutional hidden layer 622a.

The pooling hidden layer 622b can be applied after the convolutional hidden layer 622a (and after the non-linear hidden layer when used). The pooling hidden layer 622b is used to simplify the information in the output from the convolutional hidden layer 622a. For example, the pooling hidden layer 622b can take each activation map output from the convolutional hidden layer 622a and generates a condensed activation map (or feature map) using a pooling function. Max-pooling is one example of a function performed by a pooling hidden layer. Other forms of pooling functions be used by the pooling hidden layer 622a, such as average pooling, L2-norm pooling, or other suitable pooling functions. A pooling function (e.g., a max-pooling filter, an L2-norm filter, or other suitable pooling filter) is applied to each activation map included in the convolutional hidden layer 622a. In the example shown in FIG. 6, three pooling filters are used for the three activation maps in the convolutional hidden layer 622a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 622a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 622a having a dimension of 24×24 nodes, the output from the pooling hidden layer 622b will be an array of 8×8 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

Intuitively, the pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 600.

The final layer of connections in the network is a fully-connected layer that connects every node from the pooling hidden layer 622b to every one of the output nodes in the output layer 624. Using the example above, the input layer includes 28×28 nodes encoding the pixel intensities of the input image, the convolutional hidden layer 622a includes 3×24×24 hidden feature nodes based on application of a 5×5 local receptive field (for the filters) to three activation maps, and the pooling hidden layer 622b includes a layer of 3×12×12 hidden feature nodes based on application of max-pooling filter to 2×2 regions across each of the three feature maps. Extending this example, the output layer 624 can include ten output nodes. In such an example, every node of the 3×12×12 pooling hidden layer 622b is connected to every node of the output layer 624.

The fully connected hidden layer 622c can obtain the output of the previous pooling hidden layer 622b (which should represent the activation maps of high-level features) and determines the features that most correlate to a particular class. For example, the fully connected hidden layer 622c layer can determine the high-level features that most strongly correlate to a particular class and can include weights (nodes) for the high-level features. A product can be computed between the weights of the fully connected hidden layer 622c and the pooling hidden layer 622b to obtain probabilities for the different classes. For example, if the CNN 600 is being used to predict that an image is part of third-party content, high values will be present in the activation maps that represent high-level features of third-party content.

In some examples, the output from the output layer 624 can include an M-dimensional vector (in the prior example, M=10), where M can include the number of classes that the program has to choose from when classifying the image (or a portion of the image, such as one or more objects in the image). Other example outputs can also be provided. Each number in the N-dimensional vector can represent the probability that the image is associated with a certain class. As noted above, the classes can include different types of content (e.g., a first class for third party content, a second class for informational content, a third class for a move, etc.). In one illustrative example, if a 10-dimensional output vector representing ten different classes of content is [0 0 0.05 0.8 0 0 0.15 0 0 0 0], the vector indicates that there is a 5% confidence or probability that the image is associated with the third class of content (e.g., a movie), an 80% confidence or probability that the image is associated with the fourth class of content (e.g., third party content), and a 15% confidence or probability that the image is associated with the sixth class of content (e.g., informational content). The confidence or probability for a class can be considered a confidence level that the image is associated with that class of content.

The CNN 600 can be trained using any suitable training process. For example, the CNN 600 can adjust the weights of the various layers of the CNN 600 using a training process called backpropagation. Backpropagation can include a forward pass, a loss function, a backward pass, and a parameter (e.g., weight, bias, or another parameter) update. The forward pass, loss function, backward pass, and parameter update is performed for one training iteration. The process can be repeated for a certain number of iterations for each set of training images until the CNN 600 is trained well enough so that the weights (and/or other parameters) of the layers are accurately tuned.

For the example of identifying content associated with images, the forward pass can include passing a training image through the CNN 600. The weights are initially randomized before the deep learning neural CNN 600 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the CNN 600, the output will likely include values that do not give preference to any particular class due to the weights being randomly selected at initialization. For example, if the output is a vector with probabilities that the image is associated with different classes of content, the probability value for each of the different classes may be equal or at least very similar (e.g., for ten possible classes, each class may have a probability value of 0.1). With the initial weights, the CNN 600 is unable to determine low level features and thus cannot make an accurate determination of what the classification of the image might be. A loss function can be used to analyze error in the output. Any suitable loss function definition can be used. One example of a loss function includes a mean squared error (MSE). The MSE is defined as $E_{total}=\Sigma\frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning neural CNN 600 can perform a backward pass by determining which inputs (weights) most contributed to the loss of the network and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and n denotes a learning rate. The learning rate can be set to any suitable value, with a high learning rate including larger weight updates and a lower value indicating smaller weight updates.

Figure 7A:
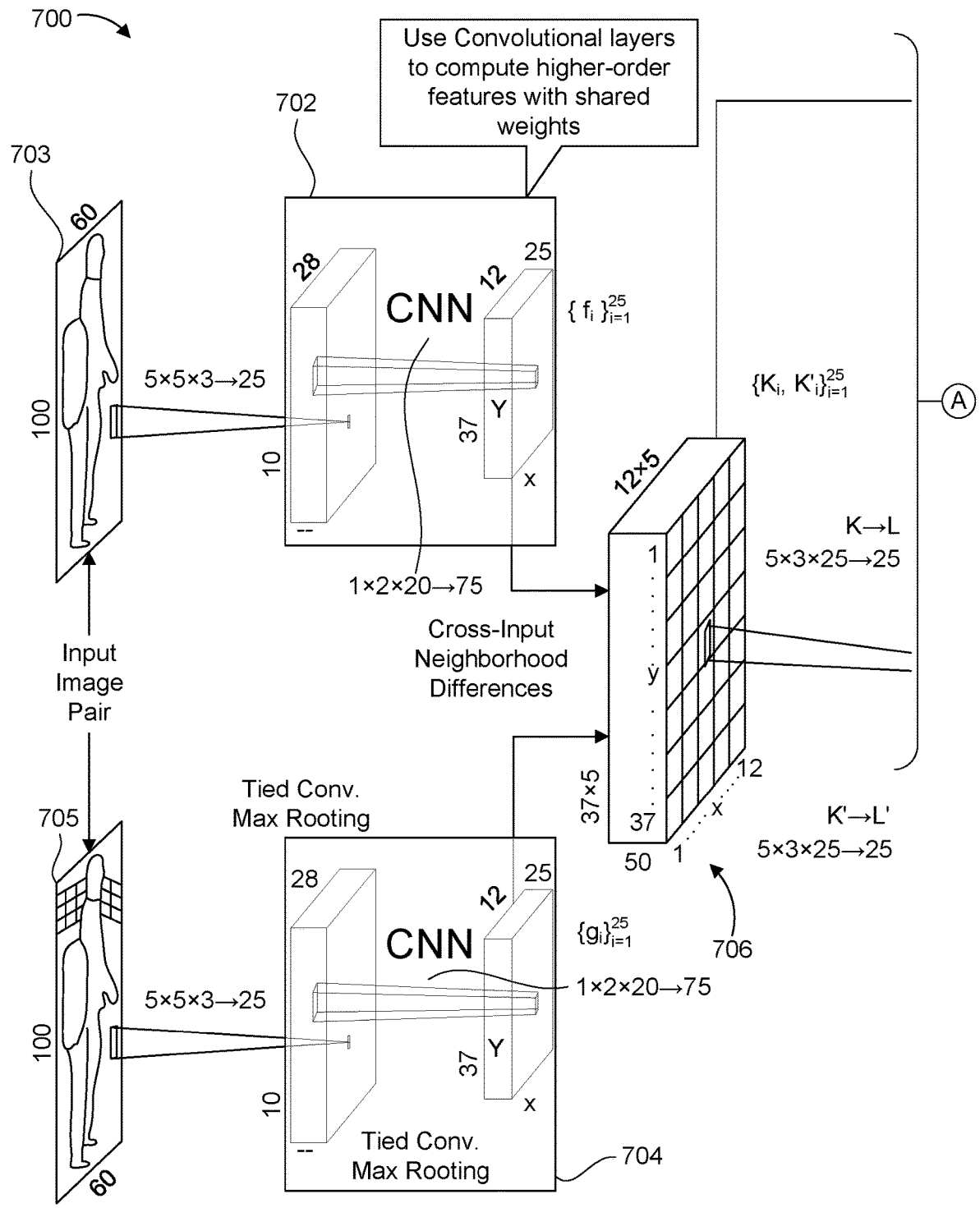
FIGS. 7A-7B is a block diagram illustrating an example of a Siamese neural network system, in accordance with some examples.
Figure 7B:
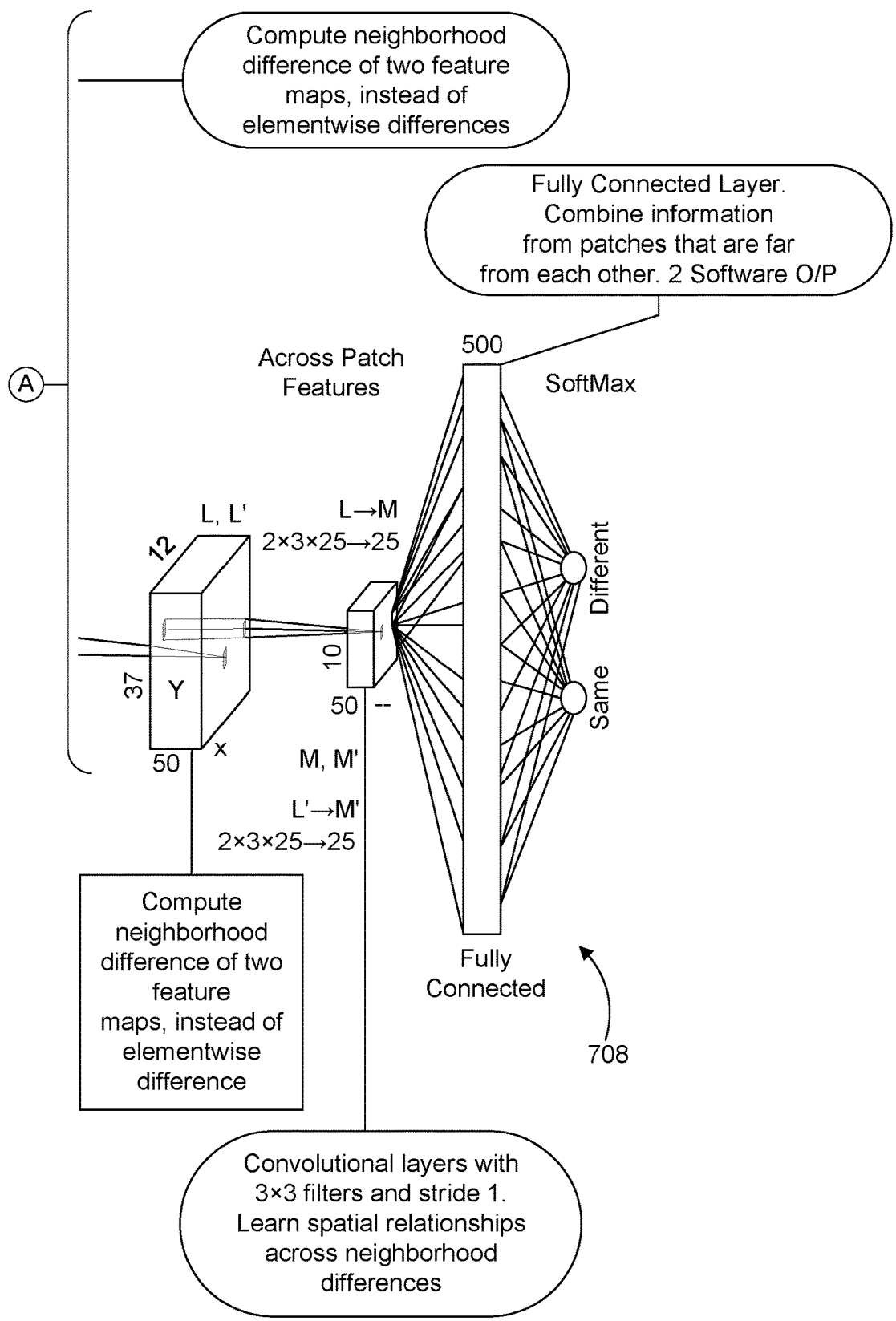

FIG. 7 is a diagram illustrating an example of a Siamese neural network 700. A Siamese neural network is a class of neural network architectures that contain two or more identical subnetworks. For example, as shown in FIG. 7, a first CNN 702 and a second CNN 704 are identical to one another. The term identical here means that the two subnetworks (CNN 702 and CNN 704) have the same configuration with the same parameters and weights. Parameter updating can be mirrored across both of the CNNs 702 and 704. In general, Siamese neural networks provide good performance when finding similarity or a certain relationship between like inputs (e.g., between two frames). Based on such a characteristic, the Siamese neural network 700 can provide good performance for the machine learning system 322 when comparing a first frame and a second frame to determine whether the second frame likely includes content of a particular type (e.g., third party content). As shown in FIG. 7, the two identical CNNs 702 and 704 process a first frame 703 and a second frame 705 and determine cross-input neighborhood differences. The differences are represented in one or more feature maps 706. A fully connected layer 708 of the Siamese neural network 700 obtains the feature data and produces the final output. In one example, the final output can include an indication of whether content in the second frame 705 is content of a particular type (e.g., third party content).

Figure 8:
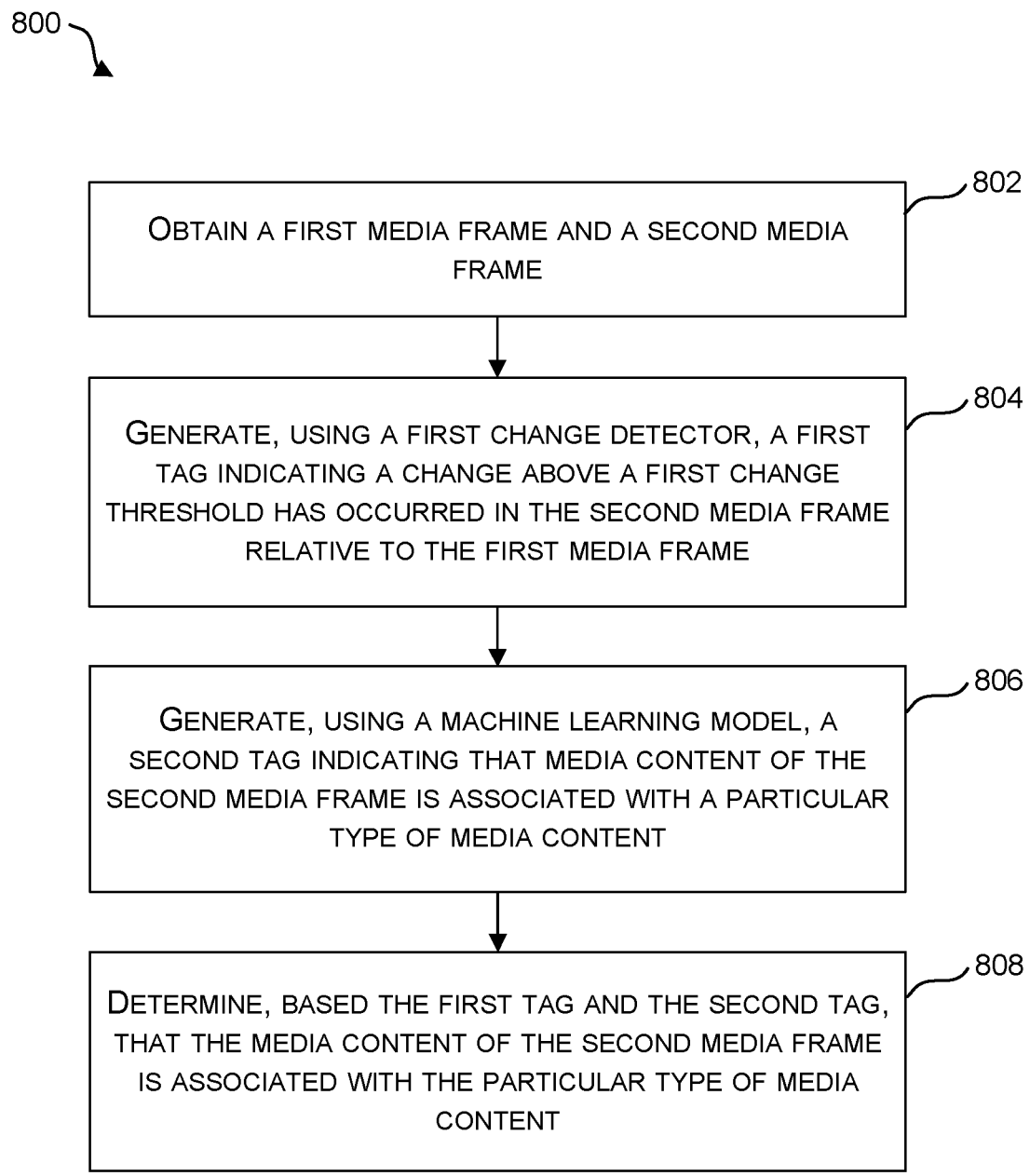
FIG. 8 is a flow diagram illustrating an example of a process for processing media content using metadata, in accordance with some examples.

FIG. 8 illustrates an example of a process 800 for processing media content using one or more of the techniques described herein. At block 802, the process 800 includes obtaining a first media frame and a second media frame. For example, the content monitoring engine 306 illustrated in FIG. 3 may obtain the first media frame and the second media frame. In some examples, the first media frame and the second media frame include encoded frames. For instance, in some examples, the first media frame and the second media frame include intra-predicted frames of a video. In some examples, the first media frame and the second media frame include unencoded frames.

At block 804, the process 800 includes generating, using a first change detector, a first tag indicating a change above a first change threshold has occurred in the second media frame relative to the first media frame. For example, the change determination engine 320 of FIG. 3, the change determination engine 420 of FIG. 4, and/or one or more of the components of FIG. 5 (e.g., the spatial segmentation engine 430, the media frame comparison engine 432, and/or the audio segmentation engine 434) may generate the first tag.

At block 806, the process 800 includes generating, using a machine learning model, a second tag indicating that media content of the second media frame is associated with a particular type of media content. For example, the machine learning system 322 of FIG. 3 and/or FIG. 5 may generate the second tag. In some examples, the particular type of media content is third party content (e.g., an advertisement or other third-party content). In some examples, the particular type of media content is informational content (e.g., a public service announcement or other informational content).

At block 808, the process 800 includes determining, based the first tag and the second tag, that the media content of the second media frame is associated with the particular type of media content. For example, the content type determination engine 324 of FIG. 3 and/or FIG. 5 may determine that the media content of the second media frame is associated with the particular type of media content based the first tag and the second tag.

In some examples, the process 800 includes obtaining a third media frame that occurs after the first and second media frames in an item of media content. In such examples, the process 800 includes generating, using the first change detector, a third tag indicating a change above the first change threshold has occurred in the third media frame. In such examples, the process 800 includes generating, using the machine learning model, a fourth tag indicating a likelihood that media content of the third media frame is not associated with the particular type of media content. In such examples, the process 800 can include determining, based the third tag and the fourth tag, that the media content of the third media frame is not associated with the particular type of media content.

In some examples, a device is tuned to a first channel, and the first media frame, the second media frame, and the third media frame are associated with a second channel. IN such examples, the process 800 can include automatically tuning the device from the first channel to the second channel based on determining that the media content of the third media frame is not associated with the particular type of media content.

In some examples, a device is tuned to a first channel, and the first media frame, the second media frame, and the third media frame are associated with a second channel. In such examples, the process 800 can include outputting a notification based on determining that the media content of the third media frame is not associated with the particular type of media content. In some cases, the notification includes an option to tune the device from the first channel to the second channel.

In some examples, the process 800 includes segmenting the second media frame into a background region and one or more foreground regions and comparing at least one of the background region and the one or more foreground regions of the second media frame to at least one of a background region and one or more foreground regions of the first media frame. In one illustrative example, the spatial segmentation engine 430 of FIG. 4 and/or FIG. 5 can segment the second media frame and compare the background region and/or the one or more foreground regions of the second media frame to the background region and/or the one or more foreground regions of the second first media frame. In such examples, the process 800 can include determining, by the first change detector based on the comparing, that the change is above the first change threshold in the second media frame relative to the first media frame.

In some examples, the process 800 includes determining, by the first change detector, that the background region and the one or more foreground regions of the second media frame have changed relative to the background region and the one or more foreground regions of the first media frame. In some examples, the process 800 includes determining, by the first change detector, that the change is above the first change threshold in the second media frame relative to the first media frame based on the background region and the one or more foreground regions of the second media frame having changed relative to the background region and the one or more foreground regions of the first media frame. In such examples, the first change detector can include the spatial segmentation engine 430.

In some examples, the process 800 includes comparing the second media frame to the first media frame, and determining, by the first change detector based on the comparing, that the change is above the first change threshold in the second media frame relative to the first media frame. In such examples, the first change detector can include one or more of the pairwise pixel difference engine 533, the statistical difference engine 535, the block-based difference engine 537, and/or the histogram difference engine 539. In some cases, comparing the second media frame to the first media frame includes comparing pixels of the second media frame to corresponding pixels of the first media frame. For example, the pairwise pixel difference engine 533 of FIG. 5 can compare the pixels of the second media frame to the corresponding pixels of the first media frame. In some cases, comparing the second media frame to the first media frame includes comparing one or more statistical characteristics of a group of pixels of the first media frame to one or more statistical characteristics of a corresponding group of pixels of the second media frame. For example, the statistical difference engine 535 of FIG. 5 can compare the one or more statistical characteristics of a group of pixels of the first media frame to the one or more statistical characteristics of a corresponding group of pixels of the second media frame. In some cases, comparing the second media frame to the first media frame includes comparing blocks of the first media frame to corresponding blocks of the second media frame. For example, the block-based difference engine 537 of FIG. 5 can compare the blocks of the first media frame to the corresponding blocks of the second media frame. In some cases, comparing the second media frame to the first media frame includes comparing a color histogram of the first media frame to a color histogram of the second media frame. For example, the histogram difference engine 539 of FIG. 5 can compare the color histogram of the first media frame to the color histogram of the second media frame.

In some examples, the process 800 includes generating, using a second change detector, a third tag indicating a change above a second change threshold has occurred in the second media frame relative to the first media frame. In such examples, the process 800 can include determining, based the first tag, the second tag, and the third tag, whether the media content of the second media frame is associated with the particular type of media content. In such examples, the first change detector and the second change detector can include two or more of the spatial segmentation engine 430, the media frame comparison engine 432 (e.g., using one or more of the pairwise pixel difference engine 533, the statistical difference engine 535, the block-based difference engine 537, and/or the histogram difference engine 539), and/or the audio segmentation engine 434.

In some examples, the process 800 includes generating, using a third change detector, a fourth tag indicating a change above a third change threshold has occurred in the second media frame relative to the first media frame. In such examples, the process 800 can include determining, based the first tag, the second tag, the third tag, and the fourth tag, whether the media content of the second media frame is associated with the particular type of media content. In such examples, the first change detector and the second change detector can include three or more of the spatial segmentation engine 430, the media frame comparison engine 432 (e.g., using one or more of the pairwise pixel difference engine 533, the statistical difference engine 535, the block-based difference engine 537, and/or the histogram difference engine 539), and/or the audio segmentation engine 434.

In some examples, the first change detector (e.g., the spatial segmentation engine 430) determines change based on comparing at least one of a background region and one or more foreground regions of the second media frame to at least one of a background region and one or more foreground regions of the first media frame. In some examples, the second change detector (e.g., the media frame comparison engine 432, such as using one or more of the pairwise pixel difference engine 533, the statistical difference engine 535, the block-based difference engine 537, and/or the histogram difference engine 539) determines change based on comparing the second media frame to the first media frame. In some examples, the third change detector (e.g., the audio segmentation engine 434) determines change based a comparison of audio associated with the second media frame with audio associated with the first media frame.

In some examples, the machine learning model includes a first neural network and a second neural network. In some cases, the first neural network can have a same configuration and a same set of parameters as the second neural network. In such examples, the process 800 can include generating a first output based on processing the first media frame using the first neural network and generating a second output-based processing the second media frame using the second neural network. The process 800 can further include determining that the first output matches the second output. Based on determining that the first output matches the second output, the process 800 can include determining that the media content of the second media frame is associated with the particular type of media content (e.g., an advertisement, informational content, etc.).

In some examples, to determine, based the first tag and the second tag, that the media content of the second media frame is associated with the particular type of media content, the process 800 can include determining that a combined weight associated with the first tag and the second tag is greater than a weight threshold. Based on determining that the combined weight is greater than the weight threshold, the process 800 can include determining that the media content of the second media frame is associated with the particular type of media content.

In some examples, the processes described herein (e.g., processes 200, 800, and/or other processes) may be performed by a computing device or apparatus. In one example, the processes can be performed by the computing system 900 shown in FIG. 9. The computing device can include any suitable device, such as a mobile device (e.g., a mobile phone), a laptop computing device, a desktop computing device, a tablet computing device, a wearable device (e.g., a virtual reality (VR) headset, an augmented reality (AR) headset, AR glasses, a network-connected watch or smartwatch, or other wearable device), a server computer, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes may be described or illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (processes 200, 800, and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
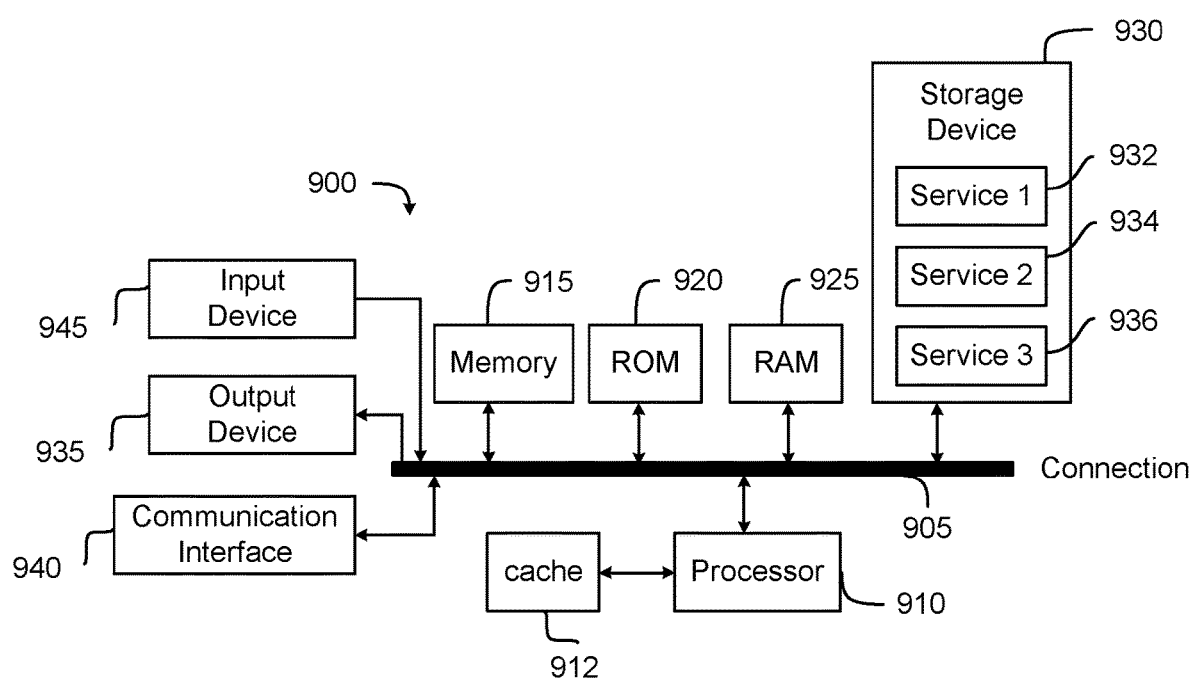
FIG. 9 is a block diagram illustrating an example of a computing system architecture, in accordance with some examples.

FIG. 9 is a diagram illustrating an example of a system for implementing certain aspects of the techniques described herein. In particular, FIG. 9 illustrates an example of computing system 900, which can be, for example, any computing device making up internal computing system, a remote computing system, a television, a set-top box, a mobile device, another computing device or system, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random-access memory (RAM) 925 to processor 910. Computing system 900 can include a cache 912 of high-speed memory connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method of processing media content, the method comprising: obtaining a first media frame and a second media frame; generating, using a first change detector, a first tag indicating a change above a first change threshold has occurred in the second media frame relative to the first media frame; generating, using a machine learning model, a second tag indicating that media content of the second media frame is associated with a particular type of media content; and determining, based the first tag and the second tag, that the media content of the second media frame is associated with the particular type of media content.

Aspect 2: The method of Aspect 1, further comprising: obtaining a third media frame, the third media frame occurring after the first and second media frames in an item of media content; generating, using the first change detector, a third tag indicating a change above the first change threshold has occurred in the third media frame; generating, using the machine learning model, a fourth tag indicating a likelihood that media content of the third media frame is not associated with the particular type of media content; and determining, based the third tag and the fourth tag, that the media content of the third media frame is not associated with the particular type of media content.

Aspect 3: The method of any of Aspects 1 to 2, wherein a device is tuned to a first channel, and wherein the first media frame, the second media frame, and the third media frame are associated with a second channel, the method further comprising: automatically tuning the device from the first channel to the second channel based on determining that the media content of the third media frame is not associated with the particular type of media content.

Aspect 4: The method of any of Aspects 1 to 3, wherein a device is tuned to a first channel, and wherein the first media frame, the second media frame, and the third media frame are associated with a second channel, the method further comprising: outputting a notification based on determining that the media content of the third media frame is not associated with the particular type of media content, the notification including an option to tune the device from the first channel to the second channel.

Aspect 5: The method of any of Aspects 1 to 4, further comprising: segmenting the second media frame into a background region and one or more foreground regions; comparing at least one of the background region and the one or more foreground regions of the second media frame to at least one of a background region and one or more foreground regions of the first media frame; and determining, by the first change detector based on the comparing, that the change is above the first change threshold in the second media frame relative to the first media frame.

Aspect 6: The method of any of Aspects 1 to 5, further comprising: determining, by the first change detector, that the background region and the one or more foreground regions of the second media frame have changed relative to the background region and the one or more foreground regions of the first media frame; and determining, by the first change detector, that the change is above the first change threshold in the second media frame relative to the first media frame based on the background region and the one or more foreground regions of the second media frame having changed relative to the background region and the one or more foreground regions of the first media frame.

Aspect 7: The method of any of Aspects 1 to 6, further comprising: comparing the second media frame to the first media frame; and determining, by the first change detector based on the comparing, that the change is above the first change threshold in the second media frame relative to the first media frame.

Aspect 8: The method of any of Aspects 1 to 7, wherein comparing the second media frame to the first media frame includes comparing pixels of the second media frame to corresponding pixels of the first media frame.

Aspect 9: The method of any of Aspects 1 to 8, wherein comparing the second media frame to the first media frame includes comparing one or more statistical characteristics of a group of pixels of the first media frame to one or more statistical characteristics of a corresponding group of pixels of the second media frame.

Aspect 10: The method of any of Aspects 1 to 9, wherein comparing the second media frame to the first media frame includes comparing blocks of the first media frame to corresponding blocks of the second media frame.

Aspect 11: The method of any of Aspects 1 to 10, wherein comparing the second media frame to the first media frame includes comparing a color histogram of the first media frame to a color histogram of the second media frame.

Aspect 12: The method of any of Aspects 1 to 11, further comprising: generating, using a second change detector, a third tag indicating a change above a second change threshold has occurred in the second media frame relative to the first media frame; and determining, based the first tag, the second tag, and the third tag, whether the media content of the second media frame is associated with the particular type of media content.

Aspect 13: The method of any of Aspects 1 to 12, further comprising: generating, using a third change detector, a fourth tag indicating a change above a third change threshold has occurred in the second media frame relative to the first media frame; and determining, based the first tag, the second tag, the third tag, and the fourth tag, whether the media content of the second media frame is associated with the particular type of media content.

Aspect 14: The method of any of Aspects 1 to 13, wherein: the first change detector determines change based on comparing at least one of a background region and one or more foreground regions of the second media frame to at least one of a background region and one or more foreground regions of the first media frame; the second change detector determines change based on comparing the second media frame to the first media frame; and the third change detector determines change based a comparison of audio associated with the second media frame with audio associated with the first media frame.

Aspect 15: The method of any of Aspects 1 to 14, wherein the machine learning model includes a first neural network and a second neural network, the first neural network having a same configuration and a same set of parameters as the second neural network, the method further comprising: generating a first output based on processing the first media frame using the first neural network; generating a second output based processing the second media frame using the second neural network; determining that the first output matches the second output; and determining, based on determining that the first output matches the second output, that the media content of the second media frame is associated with the particular type of media content.

Aspect 16: The method of any of Aspects 1 to 15, wherein determining, based the first tag and the second tag, that the media content of the second media frame is associated with the particular type of media content includes: determining that a combined weight associated with the first tag and the second tag is greater than a weight threshold; and determining, based on determining that the combined weight is greater than the weight threshold, that the media content of the second media frame is associated with the particular type of media content.

Aspect 17: The method of any of Aspects 1 to 16, wherein the first media frame and the second media frame include intra-predicted frames of a video.

Aspect 18: The method of any of Aspects 1 to 17, wherein the particular type of media content is an advertisement.

Aspect 19: The method of any of Aspects 1 to 18, wherein the first media frame and the second media frame include encoded frames.

Aspect 20: The method of any of Aspects 1 to 19, wherein the first media frame and the second media frame include unencoded frames.

Aspect 21: A system comprising: a storage configured to store instructions; a processor configured to execute the instructions and cause the processor to: obtain a first media frame and a second media frame, generating, use a first change detector, a first tag indicating a change above a first change threshold has occurred in the second media frame relative to the first media frame, generate, use a machine learning model, a second tag indicating that media content of the second media frame is associated with a particular type of media content, and determine, based the first tag and the second tag, that the media content of the second media frame is associated with the particular type of media content.

Aspect 22: The system of Aspect 21, wherein the processor is configured to execute the instructions and cause the processor to: obtain a third media frame, the third media frame occur after the first and second media frames in an item of media content; generate, use the first change detector, a third tag indicating a change above the first change threshold has occurred in the third media frame; generate, use the machine learning model, a fourth tag indicating a likelihood that media content of the third media frame is not associated with the particular type of media content; and determine, based the third tag and the fourth tag, that the media content of the third media frame is not associated with the particular type of media content.

Aspect 23: The system of any of Aspects 21 to 22, wherein the processor is configured to execute the instructions and cause the processor to: a device is tuned to a first channel, and automatically tune the device from the first channel to the second channel based on determine that the media content of the third media frame is not associated with the particular type of media content.

Aspect 24: The system of any of Aspects 21 to 23, wherein the processor is configured to execute the instructions and cause the processor to: a device is tuned to a first channel, and output a notification based on determine that the media content of the third media frame is not associated with the particular type of media content, the notification including an option to tune the device from the first channel to the second channel.

Aspect 25: The system of any of Aspects 21 to 24, wherein the processor is configured to execute the instructions and cause the processor to: segment the second media frame into a background region and one or more foreground regions; compare at least one of the background region and the one or more foreground regions of the second media frame to at least one of a background region and one or more foreground regions of the first media frame; and determine, by the first change detector based on the comparing, that the change is above the first change threshold in the second media frame relative to the first media frame.

Aspect 26: The system of any of Aspects 21 to 25, wherein the processor is configured to execute the instructions and cause the processor to: determine, by the first change detector, that the background region and the one or more foreground regions of the second media frame have changed relative to the background region and the one or more foreground regions of the first media frame; and determine, by the first change detector, that the change is above the first change threshold in the second media frame relative to the first media frame based on the background region and the one or more foreground regions of the second media frame have changed relative to the background region and the one or more foreground regions of the first media frame.

Aspect 27: The system of any of Aspects 21 to 26, wherein the processor is configured to execute the instructions and cause the processor to: compare the second media frame to the first media frame; and determine, by the first change detector based on the comparing, that the change is above the first change threshold in the second media frame relative to the first media frame.

Aspect 28: The system of any of Aspects 21 to 27, wherein comparing the second media frame to the first media frame includes comparing pixels of the second media frame to corresponding pixels of the first media frame.

Aspect 29: The system of any of Aspects 21 to 28, wherein comparing the second media frame to the first media frame includes comparing one or more statistical characteristics of a group of pixels of the first media frame to one or more statistical characteristics of a corresponding group of pixels of the second media frame.

Aspect 30: The system of any of Aspects 21 to 29, wherein comparing the second media frame to the first media frame includes comparing blocks of the first media frame to corresponding blocks of the second media frame.

Aspect 31: The system of any of Aspects 21 to 30, wherein comparing the second media frame to the first media frame includes comparing a color histogram of the first media frame to a color histogram of the second media frame.

Aspect 32: The system of any of Aspects 21 to 31, wherein the processor is configured to execute the instructions and cause the processor to: generating, use a second change detector, a third tag indicating a change above a second change threshold has occurred in the second media frame relative to the first media frame; and determine, based the first tag, the second tag, and the third tag, whether the media content of the second media frame is associated with the particular type of media content.

Aspect 33: The system of any of Aspects 21 to 32, wherein the processor is configured to execute the instructions and cause the processor to: generate, use a third change detector, a fourth tag indicating a change above a third change threshold has occurred in the second media frame relative to the first media frame; and determine, based the first tag, the second tag, the third tag, and the fourth tag, whether the media content of the second media frame is associated with the particular type of media content.

Aspect 34: The system of any of Aspects 21 to 33, wherein the processor is configured to execute the instructions and cause the processor to: the first change detector determines change based on compare at least one of a background region and one or more foreground regions of the second media frame to at least one of a background region and one or more foreground regions of the first media frame; the second change detector determines change based on compare the second media frame to the first media frame; and the third change detector determines change based a comparison of audio associated with the second media frame with audio associated with the first media frame.

Aspect 35: The system of any of Aspects 21 to 34, wherein the processor is configured to execute the instructions and cause the processor to: generate a first output based on process the first media frame use the first neural network; generate a second output based process the second media frame use the second neural network; determine that the first output matches the second output; and determine, based on determine that the first output matches the second output, that the media content of the second media frame is associated with the particular type of media content.

Aspect 36: The system of any of Aspects 21 to 35, wherein the processor is configured to execute the instructions and cause the processor to: determine that a combined weight associated with the first tag and the second tag is greater than a weight threshold; and determine, based on determine that the combined weight is greater than the weight threshold, that the media content of the second media frame is associated with the particular type of media content.

Aspect 37: The system of any of Aspects 21 to 36, wherein the first media frame and the second media frame include intra-predicted frames of a video.

Aspect 38: The system of any of Aspects 21 to 37, wherein the particular type of media content is an advertisement.

Aspect 39: The system of any of Aspects 21 to 38, wherein the first media frame and the second media frame include encoded frames.

Aspect 40: The system of any of Aspects 21 to 39, wherein the first media frame and the second media frame include unencoded frames.

Aspect 41. A computer-readable storage medium storing instructions that, when executed, cause one or more processors to perform any of the operations of Aspects 1 to 40.

What is claimed is:

1. A method of processing media content, the method comprising:
monitoring a first channel, while a device is tuned to a second channel, to obtain a first media frame and a second media frame associated with the first channel, the second media frame occurring after the first media frame;
segmenting the first media frame to generate a first background region and one or more first foreground regions, wherein the first background region represents a background of a scene represented by the first media frame and wherein the one or more first foreground regions represents a foreground of the scene represented by the first media frame;
segmenting the second media frame to generate a second background region and one or more second foreground regions, wherein the second background region represents a background of a scene represented by the second media frame and wherein the one or more second foreground regions represents a foreground of the scene represented by the second media frame;
comparing at least one of the first background region and the second background region or the one or more first foreground regions and the one or more second foreground regions to generate a first tag indicating a change above a threshold has occurred in the second media frame relative to the first media frame;
processing the second media frame, using a machine-learning model, to generate a second tag indicating that media content of the second media frame is associated with a particular type of media content, wherein the machine-learning model is trained to determine a number of probabilities that a frame is associated with a number of respective classes; and
determining, based on a combined value based on the first tag and the second tag to keep the device tuned to the second channel.

2. The method of claim 1, further comprising:
while the device is tuned to the second channel, obtaining a third media frame associated with the first channel, the third media frame occurring after the second media frame;
processing the second media frame and the third media frame to generate a third tag indicating a change above a threshold has occurred in the third media frame relative to the second media frame; and
processing the third media frame, using the machine-learning model, to generate a fourth tag indicating that media content of the third media frame is not associated with the particular type of media content.

3. The method of claim 2, further comprising tuning the device from the second channel to the first channel based on a combined value based on the third tag and the fourth tag.

4. The method of claim 2, further comprising outputting a notification based on the third tag and the fourth tag.

5. The method of claim 4, wherein the notification includes an option to tune the device from the second channel to the first channel.

6. The method of claim 5, further comprising tuning the device from the second channel to the first channel based on receiving an input indicating a selection of the option to tune the device from the second channel to the first channel.

7. The method of claim 1, further comprising:
comparing pixels of the second media frame to corresponding pixels of the first media frame; and
determining, the first tag based on the comparison.

8. The method of claim 1, further comprising:
comparing one or more statistical characteristics of a group of pixels of the first media frame to one or more statistical characteristics of a corresponding group of pixels of the second media frame; and
determining, the first tag based on the comparison.

9. The method of claim 1, further comprising:
comparing blocks of the first media frame to corresponding blocks of the second media frame; and
determining, the first tag based on the comparison.

10. The method of claim 6, further comprising:
comparing a color histogram of the first media frame to a color histogram of the second media frame; and
determining, the first tag based on the comparison.

11. The method of claim 1, wherein the machine-learning model is trained to determine probabilities that frames of media content are associated with the particular type of media content.

12. A method of processing media content, the method comprising:
monitoring a first channel, while a device is tuned to a second channel, to obtain a first media frame and a second media frame associated with the first channel, the second media frame occurring after the first media frame;
segmenting the first media frame to generate a first background region and one or more first foreground regions, wherein the first background region represents a background of a scene represented by the first media frame and wherein the one or more first foreground regions represents a foreground of the scene represented by the first media frame;
segmenting the second media frame to generate a second background region and one or more second foreground regions, wherein the second background region represents a background of a scene represented by the second media frame and wherein the one or more second foreground regions represents a foreground of the scene represented by the second media frame;
comparing at least one of the first background region and the second background region or the one or more first foreground regions and the one or more second foreground regions to generate a first tag indicating a change above a threshold has occurred in the second media frame relative to the first media frame;
processing the second media frame, using a machine-learning model, to generate a second tag indicating that media content of the second media frame is associated with media content other than a particular type of media content, wherein the machine-learning model is trained to determine a number of probabilities that a frame is associated with a number of respective classes; and
tuning the device from the second channel to the first channel based on a combined value based on the first tag and the second tag.

13. The method of claim 12, wherein the second tag indicates that the media content of the second media frame is not associated with the particular type of media content.

14. The method of claim 12, further comprising outputting a notification based on the combined value, wherein the notification includes an option to tune the device from the second channel to the first channel; and
wherein tuning the device from the second channel to the first channel is based on receiving an input indicating a selection of the option to tune the device from the second channel to the first channel.

15. The method of claim 12, further comprising:
comparing pixels of the second media frame to corresponding pixels of the first media frame; and
determining, the first tag based on the comparison.

16. The method of claim 12, further comprising:
comparing one or more statistical characteristics of a group of pixels of the first media frame to one or more statistical characteristics of a corresponding group of pixels of the second media frame; and
determining, the first tag based on the comparison.

17. The method of claim 12, wherein the machine-learning model is trained to determine probabilities that frames of media content are associated with the particular type of media content.

18. An apparatus for processing media content, the apparatus comprising:
at least one memory; and
at least one processor coupled to the at least one memory and configured to:
monitor a first channel, while a device is tuned to a second channel, to obtain a first media frame and a second media frame associated with the first channel, the second media frame occurring after the first media frame;
segmenting the first media frame to generate a first background region and one or more first foreground regions, wherein the first background region represents a background of a scene represented by the first media frame and wherein the one or more first foreground regions represents a foreground of the scene represented by the first media frame;
segmenting the second media frame to generate a second background region and one or more second foreground regions, wherein the second background region represents a background of a scene represented by the second media frame and wherein the one or more second foreground regions represents a foreground of the scene represented by the second media frame;
comparing at least one of the first background region and the second background region or the one or more first foreground regions and the one or more second foreground regions to generate a first tag indicating a change above a threshold has occurred in the second media frame relative to the first media frame;
process the second media frame, using a machine-learning model, to generate a second tag indicating that media content of the second media frame is associated with media content other than a particular type of media content, wherein the machine-learning model is trained to determine a number of probabilities that a frame is associated with a number of respective classes; and
tune the device from the second channel to the first channel based on a combined value based on the first tag and the second tag.

19. The method of claim 1, wherein the first media frame comprises a first cropped media frame and wherein the second media frame comprises a second cropped media frame.

20. The method of claim 12, wherein the first media frame comprises a first cropped media frame and wherein the second media frame comprises a second cropped media frame.

* * * * *